United States Patent
Zhou et al.

(10) Patent No.: US 11,349,543 B2
(45) Date of Patent: May 31, 2022

(54) BEAM SWITCH COUNT IN BEAMFORMED WIRELESS COMMUNICATIONS

(71) Applicant: QUALCOMM Incorporated, San Diego, CA (US)

(72) Inventors: Yan Zhou, San Diego, CA (US); Makesh Pravin John Wilson, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/667,665

(22) Filed: Oct. 29, 2019

(65) Prior Publication Data

US 2020/0162144 A1 May 21, 2020

Related U.S. Application Data

(60) Provisional application No. 62/769,528, filed on Nov. 19, 2018, provisional application No. 62/768,724, filed on Nov. 16, 2018.

(51) Int. Cl.
*H04B 7/06* (2006.01)
*H04B 7/08* (2006.01)
(Continued)

(52) U.S. Cl.
CPC ......... *H04B 7/0628* (2013.01); *H04B 7/0617* (2013.01); *H04B 7/0626* (2013.01);
(Continued)

(58) Field of Classification Search
CPC .. H04B 7/0628; H04B 7/0695; H04B 7/0882; H04B 7/0626; H04B 7/0617;
(Continued)

(56) References Cited

U.S. PATENT DOCUMENTS 8,019,303 B2 * 9/2011 Liu .................... H04L 27/2602
370/395.41
10,075,905 B2 * 9/2018 Kim .................. H04W 72/0426
(Continued)

OTHER PUBLICATIONS

"3rd Generation Partnership Project; Technical Specification Group Radio Access Network; User Equipment (UE) Radio Access Capabilities (Release 15)", 3GPP Draft; 38306-F30, 3GPP Standard; Technical Specification; 3GPP TS 38.306, 3rd Generation Partnership Project (3GPP), Mobile Competence Centre; 650, Route Des Lucioles; F-06921 Sophia-Antipolis Cedex; France, Oct. 3, 2018 (Oct. 3, 2018), pp. 1-31, XP051519482, Retrieved from the Internet: URL: http://www.3gpp.org/ftp/tsg%5Fran/WG2%5FRL2/ Specifications/201809%5Ffinal%5Fspecs%5Fafter%5FRAN%5F81/ 38306%2Df30%2Ezip [retrieved on Oct. 3, 2018], pp. 14-16.
(Continued)

*Primary Examiner* — Jean B Corrielus
(74) *Attorney, Agent, or Firm* — Danai Nelisile Mhembere; Holland & Hart LLP

(57) ABSTRACT

Methods, systems, and devices for wireless communications are described in which a user equipment (UE) may report to a base station a beam switching capability of the UE. The beam switching capability may include a number of beam switches that the UE is capable of performing within a single transmission slot. In some cases, the beam switches may be performed by a UE by applying a particular spatial domain filter for uplink or downlink communications that is associated with a particular transmission and reception beam. In some cases, the base station may schedule transmissions or beam switches during a slot based on the UE capability. The number of beam switches, in some cases, may be determined based on a rule set that defines one or more actions that are to be considered to be a beam change.

49 Claims, 14 Drawing Sheets

(51) Int. Cl.
*H04W 72/12* (2009.01)
*H04L 5/00* (2006.01)

(52) U.S. Cl.
CPC ......... *H04B 7/0695* (2013.01); *H04B 7/0882* (2013.01); *H04W 72/1205* (2013.01); *H04L 5/001* (2013.01); *H04L 5/005* (2013.01)

(58) Field of Classification Search
CPC .... H04B 7/088; H04B 7/0691; H04B 7/0874; H04W 72/1205; H04L 5/001; H04L 5/005
See application file for complete search history.

(56) References Cited

U.S. PATENT DOCUMENTS

| | | | |
|---|---|---|---|
| 10,141,986 B2* | 11/2018 | Yu | H04B 7/0695 |
| 10,498,408 B2* | 12/2019 | Yu | H04B 7/0639 |
| 2009/0213765 A1* | 8/2009 | Rinne | H04L 1/0026 |
| | | | 370/278 |
| 2013/0039345 A1* | 2/2013 | Kim | H04W 72/0413 |
| | | | 370/332 |
| 2014/0073337 A1* | 3/2014 | Hong | H01Q 21/205 |
| | | | 455/452.1 |
| 2017/0359826 A1* | 12/2017 | Islam | H04W 72/042 |
| 2019/0110210 A1* | 4/2019 | Takeda | H04B 7/08 |
| 2019/0394805 A1* | 12/2019 | Kim | H04W 56/00 |
| 2020/0120656 A1* | 4/2020 | Zhou | H04L 5/0051 |
| 2020/0213993 A1* | 7/2020 | Liu | H04W 8/24 |

OTHER PUBLICATIONS

Ericsson: "Feature Lead Summary for Beam Management—Thursday", 3GPP Draft, 3GPP TSG-RAN WG1 Meeting #94, R1-1809864 Feature Lead Summary Beam Management—Thursday, 3rd Generation Partnership Project (3GPP), Mobile Competence Centre, 650, Route Des Lucioles, F-06921 Sophia-Antipolis Cedex, vol. RAN WG1, No. Gothenburg, Aug. 20, 2018-Aug. 24, 2018, Aug. 23, 2018 (Aug. 23, 2018), XP051517219, 26 Pages, Retrieved from the Internet: URL:http://www.3gpp.org/ftp/tsg%5Fran/WG1%5FRL1/TSGR1%5F94/Docs/R1%2D1809864%2Ezip [retrieved on Aug. 23, 2018] Section 2.6.

Ericsson: "Maintenance for RS and QCL", 3GPP TSG RAN WG1 Meeting #94bis, 3GPP Draft; R1-1811171 Maintenance for RS and QCL, 3rd Generation Partnership Project (3GPP), Mobile Competence Centre, 650, Route Des Lucioles, F-06921 Sophia-Anti Polis Cedex, France, vol. RAN WG1, No. Chengdu, China; Oct. 8, 2018-Oct. 12, 2018, Sep. 29, 2018 (Sep. 29, 2018), 11 Pages, XP051518572, Retrieved from the Internet: URL: http://www.3gpp.org/ftp/tsg%5Fran/WG1%5FRL1/TSGR1%5F94b/Docs/R1%2D1811171%2Ezip, [retrieved on Sep. 29, 2018], Section 5.1; p. 7.

Ericsson: "Summary of views on Beam Measurement and Reporting—v2", 3GPP TSG RAN WG1 Meeting #95, 3GPP Draft; R1-1814041 Summary of Views on Beam Measurement and Reporting—V2, 3rd Generation Partnership Project (3GPP), vol. RAN WG1, No. Spokane, USA; Nov. 8, 2018-Nov. 12, 2018, Nov. 14, 2018 (Nov. 14, 2018), pp. 1-13, XP051494491, Retrieved from the Internet: URL: http://www.3gpp.org/ftp/tsg%5Fran/WG1%5FRL1/TSGR1%5F95/Docs/R1%2D1814041%2Ezip [retrieved on Nov. 14, 2018], Section 2.3; p. 6.

International Search Report and Written Opinion—PCT/US2019/058891—ISA/EPO—dated Jan. 23, 2020.

Samsung: "Discussion on Beam Indication for POSCH", 3GPP TSG RAN WG1 Meeting #90,3GPP Draft; R1-1714513, 3rd Generation Partnership Project (3GPP), Mobile Competence Centre, 650, Route Des Lucioles; F-06921 Sophia-Antipolis Cedex, France, vol. RAN WG1,No. Prague, Czech; Jun. 21, 2017-Jun. 25, 2017, Aug. 20, 2017 (Aug. 20, 2017), 4 Pages, XP051317288, Retrieved from the Internet: URL: http://www.3gpp.org/ftp/Meetings_3GPP_SYNC/RAN1/Docs/ [retrieved on Aug. 20, 2017], Section 2, Chapter 2 and Chapter 3.

RP-182036 Release 15 NR UE Feature List, 3GPP, Sep. 13, 2018.

\* cited by examiner

BEAM SWITCH COUNT IN BEAMFORMED WIRELESS COMMUNICATIONS

CROSS REFERENCE

The present application for patent claims the benefit of U.S. Provisional Patent Application No. 62/768,724 by Zhou al., entitled "BEAM SWITCH CHANGE COUNT IN BEAMFORMED WIRELESS COMMUNICATIONS," filed Nov. 16, 2018 and to U.S. Provisional Patent Application No. 62/769,528 by Zhou et al., entitled, "BEAM SWITCH COUNT IN BEAMFORMED WIRELESS COMMUNICATIONS," filed Nov. 19, 2018, assigned to the assignee hereof, and expressly incorporated by reference in its entirety herein.

INTRODUCTION

The following relates generally to wireless communications, and more specifically to beamformed wireless communications. Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include a number of base stations or network access nodes, each simultaneously supporting communication for multiple communication devices, which may be otherwise known as user equipment (UE).

SUMMARY

A method of wireless communication is described. The method may include establishing, at a UE, a connection with a base station using a beamformed wireless communication. The UE may determine a number of transmission and reception beam changes that the UE has a capability to support during a transmission slot. A transmission and reception beam change may be based on one or more rules. The UE may transmit, to the base station, an indication of the number of transmission and reception beam changes that the UE has the capability to support during the transmission slot.

An apparatus for wireless communication is described. The apparatus may include a processor and a memory coupled with the processor. The processor and the memory may be configured to establish, at a UE, a connection with a base station using a beamformed wireless communication. The processor and the memory may also be configured to determine a number of transmission and reception beam changes that the UE has a capability to support during a transmission slot. Each transmission and reception beam change may be based on one or more rules. The processor and the memory may also be configured to transmit, to the base station, an indication of the number of transmission and reception beam changes that the UE has the capability to support during the transmission slot.

Another apparatus for wireless communication is described. The apparatus may include means for establishing, at a UE, a connection with a base station using a beamformed wireless communication. The apparatus may include means for determining a number of transmission and reception beam changes that the UE has a capability to support during a transmission slot. Each transmission and reception beam change may be based on one or more rules. The apparatus may also include means for transmitting, to the base station, an indication of the number of transmission and reception beam changes that the UE has the capability to support during the transmission slot.

A non-transitory computer-readable medium storing code for wireless communication is described. The code may include instructions executable by a processor to establish, at a UE, a connection with a base station using a beamformed wireless communication. The code may include instructions executable by the processor to determine a number of transmission and reception beam changes that the UE has a capability to support during a transmission slot. Each transmission and reception beam change may be based on one or more rules. The code may include instructions executable by the processor to transmit, to the base station, an indication of the number of transmission and reception beam changes that the UE has the capability to support during the transmission slot.

In some examples of the method, apparatuses, and non-transitory computer-readable medium described herein, each transmission and reception beam change of the number of transmission and reception beam changes may be associated with a different instance of a reference signal transmission or reception.

In some examples of the method, apparatuses, and non-transitory computer-readable medium described herein, each transmission and reception beam change of the number of transmission and reception beam changes may be associated with adjacent orthogonal frequency division multiplexing (OFDM) symbols within the transmission slot that may have different quasi-co-location (QCL) assumptions, different spatial relations, different transmission directions, or any combinations thereof.

In some examples of the method, apparatuses, and non-transitory computer-readable medium described herein, each transmission and reception beam change of the number of transmission and reception beam changes may be associated with a changed spatial domain filter.

In some examples of the method, apparatuses, and non-transitory computer-readable medium described herein, the one or more rules may include one or more rules. In one example of a rule, if the UE may be configured with one or more synchronization signal blocks (SSBs) for reference signal measurements, the UE may be assumed to apply a same spatial domain filter to receive all symbols carrying one SSB. In another example of a rule, if the UE may be configured with a channel state information reference signal (CSI-RS) resource set with multiple repetitions, the UE may be assumed to apply different spatial domain filters to receive different CSI-RS resources of different repetitions in the CSI-RS resource set. In yet another example of a rule, if the UE may be configured with a CSI-RS resource that may have no transmission configuration indication (TCI) state configured or a sounding reference signal (SRS) resource that may have no spatial relation configured, the UE may be assumed to change spatial domain filters to receive adjacent CSI-RS resources or transmit adjacent SRS resources. In another example of a rule, if two adjacent downlink symbols within the transmission slot may have different configured or activated QCL assumptions, the UE may be assumed to apply different spatial domain filters for the two adjacent downlink symbols. In another example of a rule, if two adjacent uplink symbols within the transmission slot may have different configured or activated spatial relations, the UE may be assumed to apply different spatial domain filters for the two adjacent uplink symbols. In an example of a rule, if two adjacent symbols within the transmission slot may be uplink/downlink or downlink/uplink, the UE may be assumed to apply different spatial domain filters for the two adjacent symbols. In another example of a rule, if two adjacent downlink symbols within the transmission slot may have a same configured or activated QCL assumption, the UE may be assumed to apply the same spatial domain filter for the two adjacent downlink symbols. In another example of a rule, if two adjacent uplink symbols within the slot may have a same configured or activated spatial relation, the UE may be assumed to apply the same spatial domain filter for the two adjacent uplink symbols. Other examples of rules may include any combinations of two or more of the above rules.

In some examples of the method, apparatuses, and non-transitory computer-readable medium described herein, the transmitting the indication may include operations, features, means, or instructions for transmitting a capability indication to the base station that includes the number of transmission and reception beam changes that the UE may have the capability to support during the transmission slot.

In some examples of the method, apparatuses, and non-transitory computer-readable medium described herein, the transmitting the indication may include operations, features, means, or instructions for transmitting a UE category indication to the base station. The UE category indication may be associated with a predetermined number of supported transmission and reception beam changes within the slot.

In some examples of the method, apparatuses, and non-transitory computer-readable medium described herein, the transmitting the indication of the number of transmission and reception beam changes that the UE may have the capability to support during the transmission slot may include operations, features, means, or instructions for transmitting, via RRC signaling, the number of transmission and reception beam changes that the UE may have the capability to support during the transmission slot.

In some examples of the method, apparatuses, and non-transitory computer-readable medium described herein, the number of transmission and reception beam changes that the UE may have the capability to support during the transmission slot may be provided per component carrier.

In some examples of the method, apparatuses, and non-transitory computer-readable medium described herein, the number of transmission and reception beam changes that the UE may have the capability to support during the transmission slot may be based on a sub-carrier spacing (SCS) of each component carrier.

In some examples of the method, apparatuses, and non-transitory computer-readable medium described herein, the number of transmission and reception beam changes that the UE may have the capability to support during the transmission slot may be selected from a set of available numbers of transmission and reception beam changes based on a capability of the UE.

A method of wireless communication is described. The method may include establishing, at a UE, a connection with a base station using a beamformed wireless communication. The method may include determining a number of transmission and reception antenna set changes that the UE has a capability to support during a transmission slot. Each transmission and reception antenna set change may be based on one or more rules. The method may further include transmitting, to the base station, an indication of the number of transmission and reception antenna set changes that the UE has the capability to support during the transmission slot.

An apparatus for wireless communication is described. The apparatus may include a processor and a memory coupled with the processor. The processor and the memory may be configured to establish, at a UE, a connection with a base station using a beamformed wireless communication. The processor and the memory may be configured to determine a number of transmission and reception antenna set changes that the UE has a capability to support during a transmission slot. Each transmission and reception antenna set change is based on one or more rules. The processor and the memory are configured to transmit, to the base station, an indication of the number of transmission and reception antenna set changes that the UE has the capability to support during the transmission slot.

Another apparatus for wireless communication is described. The apparatus may include means for establishing, at a UE, a connection with a base station using a beamformed wireless communication. The apparatus may include means for determining a number of transmission and reception antenna set changes that the UE has a capability to support during a transmission slot. Each transmission and reception antenna set change may be based on one or more rules. The apparatus may include means for transmitting, to the base station, an indication of the number of transmission and reception antenna set changes that the UE has the capability to support during the transmission slot.

A non-transitory computer-readable medium storing code for wireless communication is described. The code may include instructions executable by a processor to establish, at a UE, a connection with a base station using a beamformed wireless communication. The code may include instructions executable by a processor to determine a number of transmission and reception antenna set changes that the UE has a capability to support during a transmission slot. Each transmission and reception antenna set change may be based on one or more rules. The code may include instructions executable by a processor to transmit, to the base station, an indication of the number of transmission and reception antenna set changes that the UE has the capability to support during the transmission slot.

In some examples of the method, apparatuses, and non-transitory computer-readable medium described herein, each transmission and reception antenna set change of the number of transmission and reception antenna set changes may be associated with a different instance of a reference signal transmission or reception.

In some examples of the method, apparatuses, and non-transitory computer-readable medium described herein, each transmission and reception antenna set change of the number of transmission and reception antenna set changes may be associated with adjacent OFDM symbols within the transmission slot that may have different QCL assumptions, different spatial relations, different transmission directions, or any combinations thereof.

In some examples of the method, apparatuses, and non-transitory computer-readable medium described herein, each transmission and reception antenna set change of the number of transmission and reception antenna set changes may be associated with a changed spatial domain filter.

In some examples of the method, apparatuses, and non-transitory computer-readable medium described herein, the one or more rules may include one or more rule. In one example of a rule, if the UE may be configured with one or more SSBs for reference signal measurements, the UE may be assumed to apply a same spatial domain filter to receive all symbols carrying one SSB. In another example of a rule, if the UE may be configured with a CSI-RS resource set with multiple repetitions, the UE may be assumed to apply different spatial domain filters to receive different CSI-RS resources of different repetitions in the CSI-RS resource set. In yet another example of a rule, if the UE may be configured with a CSI-RS resource that may have no TCI state configured or a SRS resource that may have no spatial relation configured, the UE may be assumed to change spatial domain filters to receive adjacent CSI-RS resources or transmit adjacent SRS resources. In another example of a rule, if two adjacent downlink symbols within the transmission slot may have different configured or activated QCL assumptions, the UE may be assumed to apply different spatial domain filters for the two adjacent downlink symbols. In another example of a rule, if two adjacent uplink symbols within the transmission slot may have different configured or activated spatial relations, the UE may be assumed to apply different spatial domain filters for the two adjacent uplink symbols. In an example of a rule, if two adjacent symbols within the transmission slot may be uplink/downlink or downlink/uplink, the UE may be assumed to apply different spatial domain filters for the two adjacent symbols. In another example of a rule, if two adjacent downlink symbols within the transmission slot may have a same configured or activated QCL assumption, the UE may be assumed to apply the same spatial domain filter for the two adjacent downlink symbols. In another example of a rule, if two adjacent uplink symbols within the slot may have a same configured or activated spatial relation, the UE may be assumed to apply the same spatial domain filter for the two adjacent uplink symbols. Other examples of rules may include any combinations of two or more of the above rules.

In some examples of the method, apparatuses, and non-transitory computer-readable medium described herein, the transmitting the indication may include operations, features, means, or instructions for transmitting a capability indication to the base station that includes the number of transmission and reception antenna set changes that the UE may have the capability to support during the transmission slot.

In some examples of the method, apparatuses, and non-transitory computer-readable medium described herein, the transmitting the indication may include operations, features, means, or instructions for transmitting a UE category indication to the base station. The UE category indication may be associated with a predetermined number of supported transmission and reception antenna set changes within the slot.

In some examples of the method, apparatuses, and non-transitory computer-readable medium described herein, the transmitting the indication may include operations, features, means, or instructions for transmitting, via RRC signaling, the number of transmission and reception antenna set changes that the UE may have the capability to support during the transmission slot.

In some examples of the method, apparatuses, and non-transitory computer-readable medium described herein, the number of transmission and reception antenna set changes that the UE may have the capability to support during the transmission slot may be provided per component carrier.

In some examples of the method, apparatuses, and non-transitory computer-readable medium described herein, the number of transmission and reception antenna set changes that the UE may have the capability to support during the transmission slot may be based on a SCS of each component carrier.

In some examples of the method, apparatuses, and non-transitory computer-readable medium described herein, the number of transmission and reception antenna set changes that the UE may have the capability to support during the transmission slot may be selected from a set of available numbers of transmission and reception antenna set changes based on a capability of the UE.

A method of wireless communication is described. The method may include establishing, at a base station, a connection with a UE using a beamformed wireless communication. The method may include the base station receiving, from a UE, a capability indication of the UE. The method may include the base station determining, based on the capability indication, a number of transmission and reception beam changes that the UE has a capability to support during a transmission slot. Each transmission and reception beam change may be based on one or more rules. The method may include the base station communicating with the UE using a number of transmission and reception beams during the transmission slot. The number of transmission and reception beams may be based on the number of transmission and reception beam changes that the UE has the capability to support during the transmission slot.

An apparatus for wireless communication is described. The apparatus may include a processor and a memory coupled with the processor. The processor and the memory may be configured to establish, at a base station, a connection with a UE using a beamformed wireless communication. The process and the memory may be configured to receive, from a UE, a capability indication of the UE. The process and the memory may also be configured to determine, based on the capability indication, a number of transmission and reception beam changes that the UE has a capability to support during a transmission slot. Each transmission and reception beam change may be based on one or more rules. The process and the memory may be configured to communicate with the UE using a number of transmission and reception beams during the transmission slot. The number of transmission and reception beams may be based on the number of transmission and reception beam changes that the UE has the capability to support during the transmission slot.

Another apparatus for wireless communication is described. The apparatus may include means for establishing, at a base station, a connection with a UE using a beamformed wireless communication. The apparatus may include means for receiving, from a UE, a capability indication of the UE. The apparatus may include means for determining, based on the capability indication, a number of transmission and reception beam changes that the UE has a capability to support during a transmission slot. Each transmission and reception beam change may be based on one or more rules The apparatus may include means for communicating with the UE using a number of transmission and reception beams during the transmission slot. The number of transmission and reception beams may be based on the number of transmission and reception beam changes that the UE has the capability to support during the transmission slot.

A non-transitory computer-readable medium storing code for wireless communication is described. The code may include instructions executable by a processor to establish, at a base station, a connection with a UE using a beamformed wireless communication. The code may include instructions executable by a processor to receive, from a UE, a capability indication of the UE. The code may include instructions executable by a processor to determine, based on the capability indication, a number of transmission and reception beam changes that the UE has a capability to support during a transmission slot. Each transmission and reception beam change may be based on one or more rules. The code may include instructions executable by a processor to communicate with the UE using a number of transmission and reception beams during the transmission slot. The number of transmission and reception beams may be based on the number of transmission and reception beam changes that the UE has the capability to support during the transmission slot.

In some examples of the method, apparatuses, and non-transitory computer-readable medium described herein, two or more transmission and reception beams of the number of transmission and reception beams may be each associated with a different instance of a reference signal transmission or reception. In some examples, different OFDM symbols within the transmission slot that may have different QCL assumptions, different spatial relations, different transmission directions, or any combinations thereof.

In some examples of the method, apparatuses, and non-transitory computer-readable medium described herein, each transmission and reception beam of the number of transmission and reception beams may be associated with a different spatial domain filter.

In some examples of the method, apparatuses, and non-transitory computer-readable medium described herein, the one or more rules may include one or more rules. In one example of a rule, if the UE may be configured with one or more SSBs for reference signal measurements, the UE may be assumed to apply a same spatial domain filter to receive all symbols carrying one SSB. In another example of a rule, if the UE may be configured with a CSI-RS resource set with multiple repetitions, the UE may be assumed to apply different spatial domain filters to receive different CSI-RS resources of different repetitions in the CSI-RS resource set. In another example of a rule, if the UE may be configured with a CSI-RS resource that may have no TCI state configured or a SRS resource that may have no spatial relation configured, the UE may be assumed to change spatial domain filters to receive adjacent CSI-RS resources or transmit adjacent SRS resources. In another example of a rule, if two adjacent downlink symbols within the transmission slot may have different configured or activated QCL assumptions, the UE may be assumed to apply different spatial domain filters for the two adjacent downlink symbols. In another example of a rule, if two adjacent uplink symbols within the transmission slot may have different configured or activated spatial relations, the UE may be assumed to apply different spatial domain filters for the two adjacent uplink symbols. In another example of a rule, if two adjacent symbols within the transmission slot may be uplink/downlink or downlink/uplink, the UE may be assumed to apply different spatial domain filters for the two adjacent symbols. In another example of a rule, if two adjacent downlink symbols within the transmission slot may have a same configured or activated QCL assumption, the UE may be assumed to apply the same spatial domain filter for the two adjacent downlink symbols. In another example of a rule, if two adjacent uplink symbols within the slot may have a same configured or activated spatial relation, the UE may be assumed to apply the same spatial domain filter for the two adjacent uplink symbols. Other examples of rules may include any combinations of two or more of the above rules.

A method of wireless communication is described. The method may include establishing, at a base station, a connection with a UE using a beamformed wireless communication. The method may include receiving, from a UE, a capability indication of the UE, determining, based on the capability indication, of a number of transmission and reception antenna set changes that the UE has a capability to support during a transmission slot. Each transmission and reception antenna set change may be based on one or more rules. The method may include communicating with the UE using a number of transmission and reception antenna sets during the transmission slot. The number of transmission and reception antenna sets may be based on the number of transmission and reception antenna set changes that the UE has the capability to support during the transmission slot.

An apparatus for wireless communication is described. The apparatus may include a processor and a memory coupled with the processor. The processor and the memory may be configured to cause the apparatus to establish, at a base station, a connection with a UE using a beamformed wireless communication. The processor and the memory may be configured to receive, from a UE, a capability indication of the UE. The processor and the memory may be configured to determine, based on the capability indication, of a number of transmission and reception antenna set changes that the UE has a capability to support during a transmission slot. Each transmission and reception antenna set change is based on one or more rules. The processor and the memory may be configured to communicate with the UE using a number of transmission and reception antenna sets during the transmission slot. The number of transmission and reception antenna sets may be based on the number of transmission and reception antenna set changes that the UE has the capability to support during the transmission slot.

Another apparatus for wireless communication is described. The apparatus may include means for establishing, at a base station, a connection with a UE using a beamformed wireless communication. The apparatus may include means for receiving, from a UE, a capability indication of the UE. The apparatus may include means for determining, based on the capability indication, of a number of transmission and reception antenna set changes that the UE has a capability to support during a transmission slot. Each transmission and reception antenna set change may be based on one or more rules. The apparatus may include means for communicating with the UE using a number of transmission and reception antenna sets during the transmission slot. The number of transmission and reception antenna sets may be based on the number of transmission and reception antenna set changes that the UE has the capability to support during the transmission slot.

A non-transitory computer-readable medium storing code for wireless communication is described. The code may include instructions executable by a processor to establish, at a base station, a connection with a UE using a beamformed wireless communication. The code may include instructions executable by a processor to receive, from a UE, a capability indication of the UE. The code may include instructions executable by a processor to determine, based on the capability indication, of a number of transmission and reception antenna set changes that the UE has a capability to support during a transmission slot. Each transmission and reception antenna set change may be based on one or more rules. The code may include instructions executable by a processor to communicate with the UE using a number of transmission and reception antenna sets during the transmission slot. The number of transmission and reception antenna sets may be based on the number of transmission and reception antenna set changes that the UE has the capability to support during the transmission slot.

In some examples of the method, apparatuses, and non-transitory computer-readable medium described herein, two or more transmission and reception antenna sets of the number of transmission and reception antenna sets may be each associated with a different instance of a reference signal transmission or reception, different OFDM symbols within the transmission slot that may have different QCL assumptions, different spatial relations, different transmission directions, or any combinations thereof.

In some examples of the method, apparatuses, and non-transitory computer-readable medium described herein, each transmission and reception antenna set of the number of transmission and reception antenna sets may be associated with a different spatial domain filter.

In some examples of the method, apparatuses, and non-transitory computer-readable medium described herein, the one or more rules may include one or more of the following rules. In one example of a rule, if the UE may be configured with one or more SSBs for reference signal measurements, the UE may be assumed to apply a same spatial domain filter to receive all symbols carrying one SSB. In another example of a rule, if the UE may be configured with a CSI-RS resource set with multiple repetitions, the UE may be assumed to apply different spatial domain filters to receive different CSI-RS resources of different repetitions in the CSI-RS resource set. In another example of a rule, if the UE may be configured with a CSI-RS resource that may have no TCI state configured or a SRS resource that may have no spatial relation configured, the UE may be assumed to change spatial domain filters to receive adjacent CSI-RS resources or transmit adjacent SRS resources. In another example of a rule, if two adjacent downlink symbols within the transmission slot may have different configured or activated QCL assumptions, the UE may be assumed to apply different spatial domain filters for the two adjacent downlink symbols. In another example of a rule, if two adjacent uplink symbols within the transmission slot may have different configured or activated spatial relations, the UE may be assumed to apply different spatial domain filters for the two adjacent uplink symbols. In another example of a rule, if two adjacent symbols within the transmission slot may be uplink/downlink or downlink/uplink, the UE may be assumed to apply different spatial domain filters for the two adjacent symbols. In another example of a rule, if two adjacent downlink symbols within the transmission slot may have a same configured or activated QCL assumption, the UE may be assumed to apply the same spatial domain filter for the two adjacent downlink symbols. In another example of a rule, if two adjacent uplink symbols within the slot may have a same configured or activated spatial relation, the UE may be assumed to apply the same spatial domain filter for the two adjacent uplink symbols. Other examples of rules may include any combinations of two or more of the above rules.

DETAILED DESCRIPTION

Figure 1:
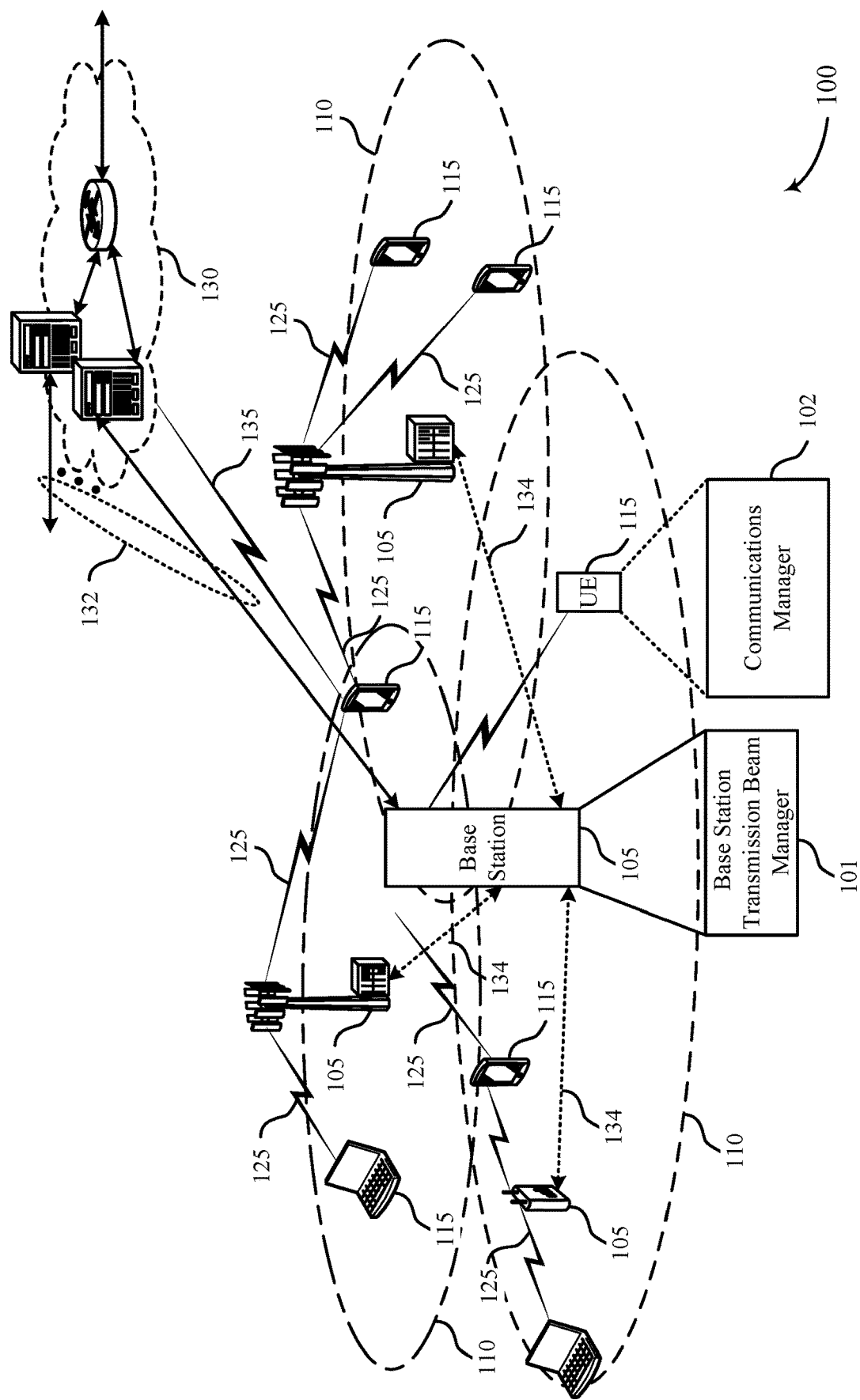
FIG. 1 illustrates an example of a wireless communications system that supports beam switch count in beamformed wireless communications in accordance with one or more aspects of the present disclosure.

In some cases, wireless devices (e.g., base stations, UEs, etc.) may use beamformed or precoded signals for transmission or reception of wireless communications. For example, a base station may utilize beamformed or precoded transmissions to provide directional transmissions on directional beams. Non-beamformed or non-precoded transmissions (e.g., non-directional transmissions) may have a relatively wide beam or omnidirectional transmission pattern. Directional transmissions may have lower path losses than non-directional transmissions. Thus, directional transmissions may mitigate path losses that would otherwise exist based on using non-directional transmissions.

However, using directional transmissions may result in frequent switching of beams relative to non-directional transmissions, for example in order to maintain channel quality. In some cases, beam switching may be need as a result of UE movement out of a path of a beam for a directional transmission. In other cases, interference may interfere with a particular beam for a direction transmission, requiring beam switching. In some examples, beam switching to a new beam may be needed due to permissible exposure limits (e.g., maximum permissible exposure (MPE) limits) associated with one or more current directional beams. In some examples, a combination of these factors may require beam switching. Efficient techniques for performing such beam switching may enhance reliability and efficiency of a network utilizing beamforming.

Various aspects of the present disclosure relate to methods, systems, devices, and apparatuses that support beam switching in accordance with a beam switching capability of a UE. In some cases, a UE may report to a base station a beam switching capability of the UE. The beam switching capability may include a number of beam switches that the UE is capable of performing within a single transmission slot. In some cases, the beam switches may be performed by a UE by applying a particular spatial domain filter for uplink or downlink communications associated with a particular transmission and reception beam. In some cases, the base station may schedule transmissions or beam switches during a slot (e.g., a subframe, transmission time interval (TTI), etc.) based on the UE capability. The number of beam switches, in some cases, may be determined based on a rule set that defines one or more actions that are to be considered to be a beam change. In some cases, the rule set may be predetermined In some cases, different UEs may have different capabilities for a number of beam switches that the UE can perform within a transmission slot. For example, some UEs may have relatively lower processing power and/or have transmit/receive circuitry that supports relatively lower numbers of beam switches within a transmission slot relative to other UEs that may have higher processing power and/or transmit/receive circuitry that can support higher number of beam switches. Beam switches may be performed within a transmission slot to transmit or receive different communications, such as communications using SSBs, communications including one or more reference signals, downlink or uplink communications having different beamforming parameters (e.g., adjacent symbols with different configured/activated spatial relationships), switching between downlink and uplink transmissions, or any combinations thereof. Techniques such as provided herein may allow a base station to more efficiently schedule and allocate resources for UEs based on their capabilities for performing beam switching in accordance with the rule set.

Aspects of the disclosure are initially described in the context of a wireless communications system. Aspects of the disclosure are further illustrated by and described with reference to apparatus diagrams, system diagrams, and flowcharts that relate to beam switch count in beamformed wireless communications.

FIG. 1 illustrates an example of a wireless communications system 100 that supports beam switch count in beamformed wireless communications in accordance with one or more aspects of the present disclosure. The wireless communications system 100 includes base stations 105, UEs 115, and a core network 130. In some examples, the wireless communications system 100 may be a LTE network, an LTE-A network, an LTE-A Pro network, or a NR network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 kilometers (km)) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that may be capable of tolerating interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE- Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a carrier aggregation configuration in conjunction with component carriers operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving device is equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g., synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a set of antenna elements of an antenna array, or by processing received signals according to different receive beamforming weight sets applied to signals received at a set of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based on listening according to different receive beam directions (e.g., a beam direction determined to have a highest signal strength, highest signal-to-noise ratio, or otherwise acceptable signal quality based on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115.

Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the RRC protocol layer may provide establishment, configuration, and maintenance of an RRC connection between a UE 115 and a base station 105 or core network 130 supporting radio bearers for user plane data. At the Physical layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200$ $T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a TTI. In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an evolved universal mobile telecommunication system terrestrial radio access (E-UTRA) absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as OFDM or DFT-S-OFDM).

The organizational structure of the carriers may be different for different radio access technologies (e.g., LTE, LTE-A, LTE-A Pro, NR). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of bandwidths for carriers of a particular radio access technology (e.g., 1.4, 3, 5, 10, 15, 20, 40, or 80 MHz). In some cases, the bandwidths may be predetermined. In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or resource blocks (RBs)) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs 115 that support simultaneous communications via carriers associated with more than one different carrier bandwidth.

Wireless communications system 100 may support communication with a UE 115 on multiple cells or carriers, a feature which may be referred to as carrier aggregation or multi-carrier operation. A UE 115 may be configured with multiple downlink component carriers and one or more uplink component carriers according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other component carriers, which may include use of a reduced symbol duration as compared with symbol durations of the other component carriers. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications system 100 may be an NR system that may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

In cases where a base station 105 and UE 115 use beamformed communications for communications, one or more of the base stations 105 may include base station transmission beam manager 101. The base station transmission beam manager 101 may determine transmission and reception beams to use for communications with a UE 115. The base station transmission beam manager 101 may, in such cases, establish a connection with a UE 115 using beamformed wireless communications, receive an indication of a number of transmission and reception beam changes that the UE 115 is capable of supporting during a slot, each transmission and reception beam change associated with a changed spatial domain filter, and communicate with the UE 115 based on the indicated number of transmission and reception beam changes that the UE 115 is capable of supporting during the slot. In some cases, the base station transmission beam manager 101 may schedule transmissions or beam switches during a slot based on the UE 115 capability. The number of beam switches, in some cases, may be determined based on a rule set that defines one or more actions that are to be considered to be a beam change.

Further, in cases where a base station 105 and UE 115 use beamformed communications for communications, one or more of the UEs 115 may include UE transmission beam manager 102. The UE transmission beam manager 102 may determine transmission and reception beams to use for communications with the base station 105. The UE transmission beam manager 102 may, in such cases, report to the base station 105 a beam switching capability of the UE 115. The beam switching capability may include a number of beam switches that the UE 115 is capable of performing within a single transmission slot. In some cases, the beam switches may be performed by the UE 115 by applying a particular spatial domain filter for uplink or downlink communications that is associated with a particular transmission and reception beam. The number of beam switches, in some cases, may be determined based on a rule set that defines one or more actions that are to be considered to be a beam switch. The terms beam switch and beam change may be used interchangeable herein.

Figure 2:
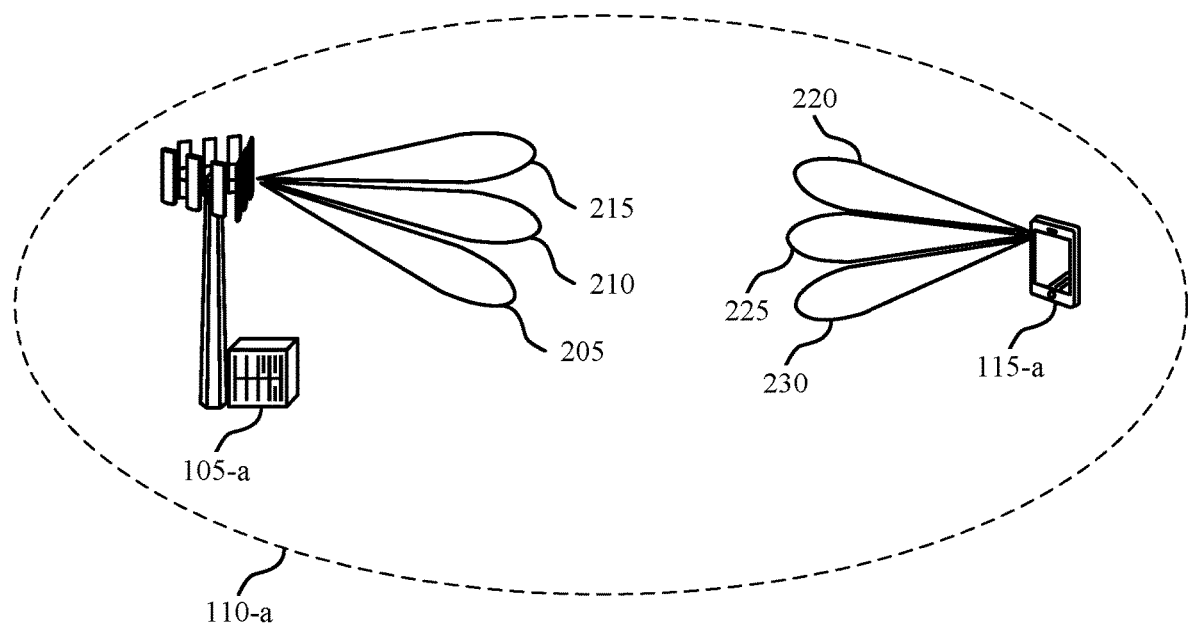
FIG. 2 illustrates an example of a wireless communications system that supports beam switch count in beamformed wireless communications in accordance with one or more aspects of the present disclosure.

FIG. 2 illustrates an example of a wireless communications system 200 that supports beam switch count in beamformed wireless communications in accordance with one or more aspects of the present disclosure. In some examples, wireless communications system 200 may implement aspects of wireless communications system 100. The wireless communications system 200 may include base station 105-a and UE 115-a, which may be examples of a base station 105 and a UE 115, as described with reference to FIG. 1.

Base station 105-a may provide network coverage for geographic area 110-a. Base station 105-a and UE 115-a may communicate using beamformed or directional transmissions, and non-beamformed transmissions. For example, in downlink communications, base station 105-a may transmit downlink transmissions to UE 115-a using a beamformed downlink transmission beam 210, which may be one of a number of downlink transmission beams used by the base station 105-a, such as other downlink transmission beams 205 and 215. The UE 115-a may transmit uplink transmissions to the base station 105-a using a beamformed uplink transmission beam 220, 225, or 230. The UE 115-a and base station 105-a may use beamforming parameters associated with a particular transmission beam to configure receive hardware for transmitting/receiving beamformed transmissions.

In some cases, UE 115-a and base station 105-a may perform a beam sweep procedure to establish one or more beam pair links that have an associated transmission and reception beam, and the UE 115-a and base station 105-a may switch between beam pair links during a transmission slot. The beamforming parameters may include a particular spatial domain filter for uplink or downlink communications that is associated with a particular transmission and reception beam. The beamforming parameters of a particular beam, in some cases, may be determined based on one or more reference signals that are received on a transmission beam that is QCLed with the particular beam. Two antenna ports are said to be QCLed if properties of the channel over which a symbol on one antenna port is conveyed can be inferred from the channel over which a symbol on the other antenna port is conveyed. In some cases, QCL may apply to a spatial receive parameter, which may be referred to as QCL-TypeD.

In some cases, the UE 115-a may report a capability of a number of beam switches that the UE 115-a may perform during a slot. Such an indication may indicate a maximum number of transmission and reception beam changes the UE 115-a can conduct during a slot across the whole band CC ($B_{B\_Total}$) In some cases, this number may be defined per SCS. In some cases, the UE 115-a may report that there is no restriction on the number of beam changes during a slot, or may indicate a value associated with the maximum number of beam changes during the slot. In some cases, the value of the maximum number of beam changes may be selected from a set of available values, such as 4, 7, or 14 beam changes during a slot.

In some cases, the base station 105-a may schedule transmissions or beam switches during a slot based on the UE 115-a capability. The number of beam switches, in some cases, may be determined based on a rule set that defines one or more actions that are considered to be a beam change, such as a rule set that is discussed in more detail with respect to FIG. 3.

In some cases, the base station 105-a may establish a connection with the UE 115-a using beamformed wireless communications, and receive a capability indication from the UE 115-a. The capability indication may indicate a number of beam switches that the UE 115-a can perform in the transmission slot. Additionally or alternatively, the capability indication may indicate a number of transmission and reception antenna set changes that the UE is capable of supporting during the transmission slot. The base station 105-a may communicate with the UE 115-a using a number of transmission and reception beams, a number of a number of antenna sets, of combinations thereof, during the transmission slot.

Figure 3:
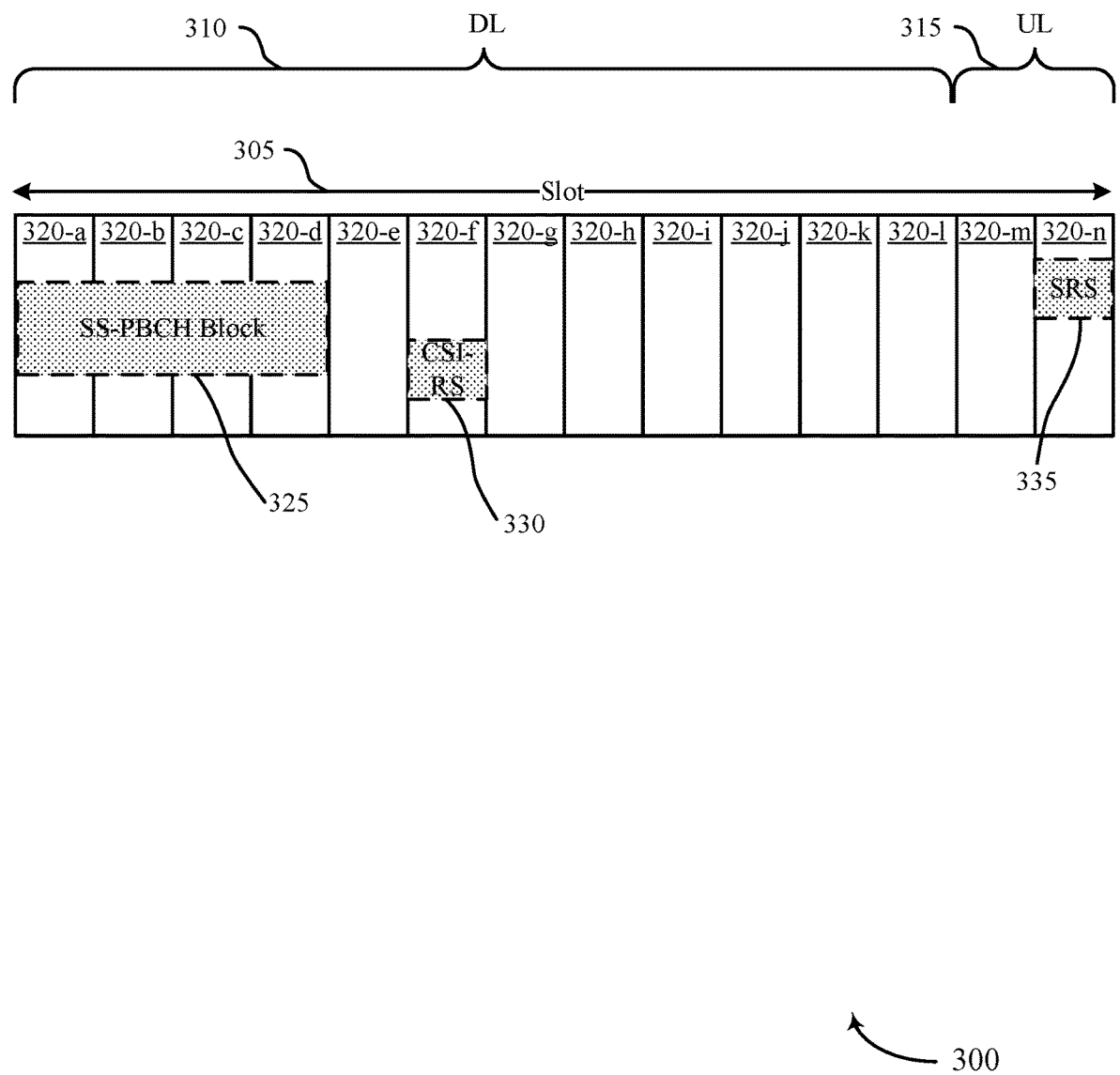
FIG. 3 illustrates an example of a transmission slot that supports beam switch count in beamformed wireless communications in accordance with one or more aspects of the present disclosure.

FIG. 3 illustrates an example of a transmission slot 300 that supports beam switch count in beamformed wireless communications in accordance with one or more aspects of the present disclosure. In some examples, transmission slot 300 may implement aspects of wireless communications system 100. In this example, transmission slot 300 may span a time period 305 that is associated with a number of symbols 320 (e.g., OFDM symbols) within the slot and a SCS for the transmission slot 300. In this example, the transmission slot 300 includes downlink symbols 310 and uplink symbols 315. It is noted that the example of FIG. 3 is provided for purposes of illustration and discussion only, and techniques discussed herein may be used for any slot format.

As indicated herein, in some cases a UE may provide an indication of a number of beam changes that may be performed during a transmission slot such as transmission slot 300. In some cases, the indication may provide a maximum number of beam changes that the UE may perform. In some cases, the indication may be an indication of a UE capability or a UE class that may be associated with a particular maximum number of beam changes during a transmission slot. In some cases, the number of beam changes may be selected from a set of available numbers of beam changes, such as 4, 7, or 14 beam changes.

In some cases, a beam change may be an event that is defined according to a rule set that includes one or more rules for applying same or different spatial domain filters for transmission and reception beam, and thus whether the event is considered a beam change. When counting the number of spatial domain filter changes (e.g., within a slot), the UE may assume a rule set. In some cases, the rule set may include one or more of the following rules, or any combinations thereof.

In an example of a rule, if a UE is configured with SS-PBCH block(s) for L1-RSRP measurement, the UE is assumed to apply the same spatial domain filter to receive all OFDM symbols carrying one SS-PBCH block. For example, if the UE is configured with one or more SSBs (e.g., SS-PBCH block(s)) for reference signal measurements (e.g., if the UE is configured with SS-PBCH block 325 for L1-RSRP measurement), the UE 115-a may apply a same spatial domain filter to receive all symbols (e.g., OFDM symbols) carrying one SSB (e.g., SS-PBCH block). For example, In an example of a rule, if a UE is configured with a CSI-RS resource set with high layer parameter repetition set to be "ON," the UE is assumed to apply different spatial domain filters to receive different CSI-RS resources in the CSI-RS resource set. For example, if the UE is configured with a CSI-RS resource set with multiple repetitions, the UE may be assumed to apply different spatial domain filters to receive different CSI-RS resources 330.

In an example of a rule, if a UE is configured with CSI-RS resource that has no TCI state configured or SRS resource that has no spatial relation configured, the UE is assumed to change spatial domain filters to receive adjacent CSI-RS resources or transmit adjacent SRS resources. For example, if the UE is configured with CSI-RS resources 330 that has no TCI state configured or SRS 335 resource that has no spatial relation configured, the UE is assumed to change spatial domain filters to receive adjacent CSI-RS resources or transmit adjacent SRS resources. In some examples the adjacent SRS resources may be a SRS resource set.

In an example of a rule, if two adjacent DL symbols with different configured/activated QCL-TypeD assumptions, the UE is assumed to apply different spatial domain filters. For example, if two adjacent downlink symbols 320-d and 320-e within a slot have different configured or activated QCL assumptions (e.g., different QCL-TypeD assumptions), the UE may apply different spatial domain filters. In these cases, the UE may apply different spatial domain filters for the adjacent downlink symbols.

In an example of a rule, if two adjacent UL symbols with different configured/activated spatial relations, the UE is assumed to apply different spatial domain filters. For example, if two adjacent uplink symbols (e.g., adjacent uplink symbols 320-m and 320-n) have different configured or activated spatial relations, the UE may apply different spatial domain filters. The UE may apply different spatial domain filters for the adjacent uplink symbols.

In an example of a rule, if two adjacent symbols within the slot are uplink-downlink or downlink-uplink, the UE is assumed to apply different spatial domain filters. For example, if adjacent downlink symbols 320-l and 320-m within the slot are downlink-uplink (e.g., or uplink-downlink), the UE may apply different spatial domain filters. In these cases, the UE may apply different spatial domain filters for the adjacent symbols.

In an example of a rule, if two adjacent DL symbols with the same configured/activated QCL-TypeD assumptions, the UE is assumed to apply the same spatial domain filter. For example, if adjacent symbols 320-*a* and 320-*b* within the slot have a same configured or activated QCL assumptions, the UE may apply the same spatial domain filter. For example, the UE may apply the same spatial domain filter for the adjacent downlink symbols.

In an example of a rule, if two adjacent UL symbols with the same configured/activated spatial relation, the UE is assumed to apply the same spatial domain filter. For example, if adjacent uplink symbols 320-*m* and 320-*n* have a same configured or activated QCL assumptions, the UE may apply the same spatial domain filter. For example, the UE may apply the same spatial domain filter for the adjacent uplink symbols. In some cases, if the UE switches antennas within the slot, the UE is assumed to apply different spatial domain filters.

In an example of a rule, for adjacent symbols with different downlink/uplink directions, it should be counted as one beam switch. For example, adjacent symbols 320 with different downlink/uplink directions (e.g., 320-1 and 320-*m*), may be counted as one beam switch.

In some example, besides a beam switch, an antenna switch should be considered. For example, an antenna switch may be considered or substituted in rather than a beam switch for one or more of the rules above (e.g., two receive antennas plus one transmit antennas should be considered in a rule).

As indicated herein any of these rules of this exemplary rule set may be applied alone or in any combination.

Figure 4:
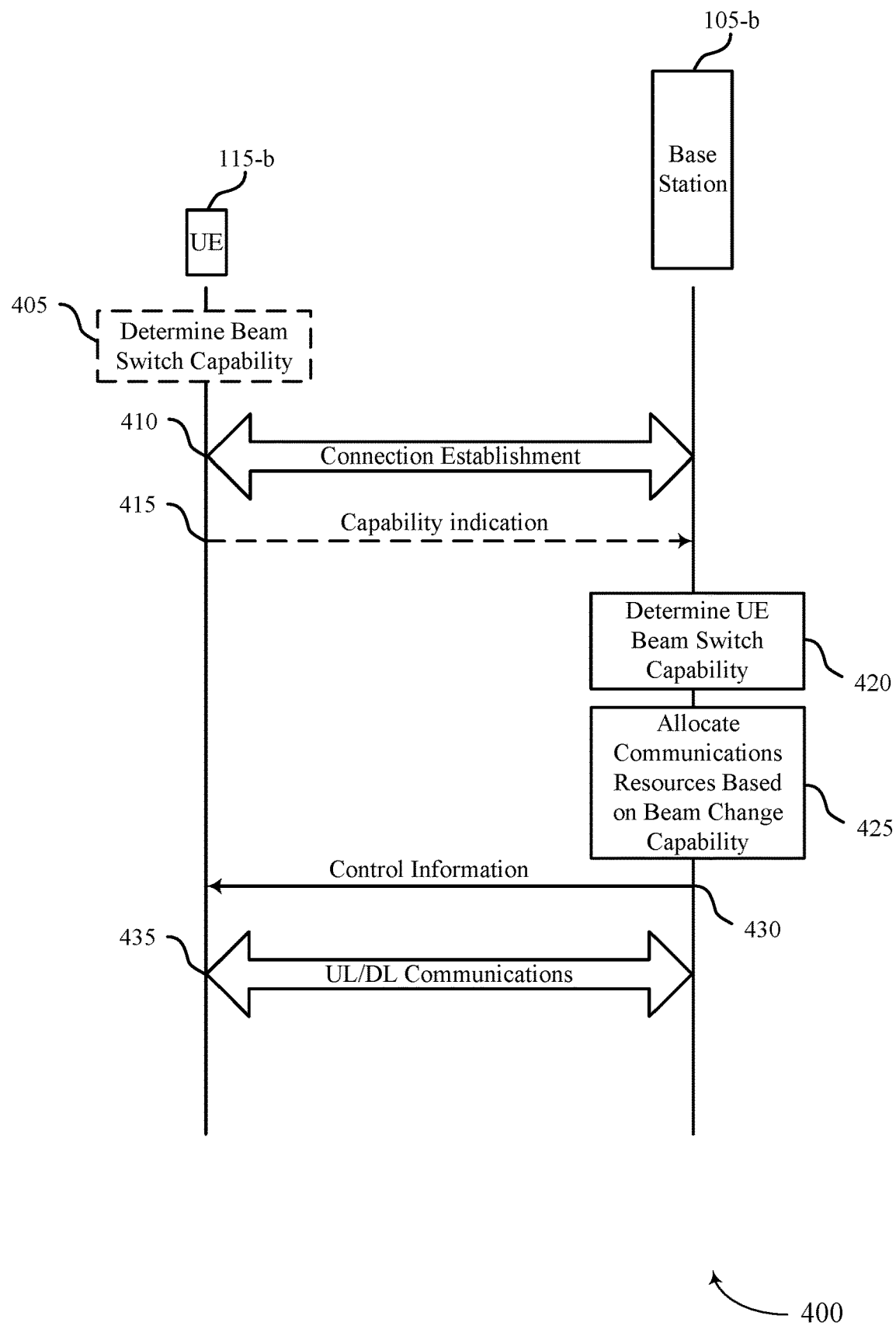
FIG. 4 illustrates an example of a process flow in a system that that supports beam switch count in beamformed wireless communications in accordance with one or more aspects of the present disclosure.

FIG. 4 illustrates an example of a process flow 400 that supports beam switch count in beamformed wireless communications in accordance with one or more aspects of the present disclosure. In some examples, process flow 400 may implement aspects of wireless communications system 100 or 200. In this example, process flow may include a UE 115-*b*, and a base station 105-*b*, which may each be examples of the corresponding devices described with respect to FIGS. 1-2. Alternative examples of the following may be implemented, where some processes may be combined, are performed in a different order than described or are not performed at all. In some cases, processes may include additional features not mentioned herein, or further processes may be added.

At 405, the UE 115-*a* may optionally determine a beam switch capability. In some cases, the UE 115-*a* may determine a maximum number of beam switches that it may perform within a transmission slot. In some cases, the UE 115-*a* may make such a determination based on conditions at the UE 115-*b* (e.g., a power status or temperature status of the UE 115-*b*, MPE considerations, etc.).

At 410, the base station 105-*b* may establish a connection with the UE 115-*b*. Such a connection establishment may be performed using established connection establishment techniques, such as a random access procedure. In some cases, as part of the connection establishment, each UE 115-*b* and base station 105-*b* may perform a beam sweep procedure to establish one or more beam pair links that have an associated transmission and reception beam, and the UE 115-*b* and base station 105-*b* may switch between beam pair links during a transmission slot.

At 415, the UE 115-*b* may optionally transmit a capability indication to the base station 105-*b* that indicates the number of beam changes that the UE 115-*b* is capable of performing during a transmission slot. In some cases, the capability indication may be provided as part of the connection establishment. In some cases, the capability indication may indicate a number of transmission and reception beam changes the UE 115-*b* can perform. In some cases, the capability indication may indicate a UE category that may be associated with a number of transmission and reception beam changes. In some cases, the capability indication may be transmitted in RRC signaling. Additionally or alternatively, the UE 115-*b* may indicate a number of transmit and receive antenna set switches that the UE is capable of supporting during the transmission slot.

At 420, the base station 105-*b* may determine the UE 115-*b* beam switch capability, a number of antenna sets capability, or combinations thereof. This determination may be made based on the reported capability indication provided by the UE 115-*b*. At 425, the base station 105-*b* may allocate communications resources based on the beam switch capability of the UE 115-*b*. For example, if the UE 115-*b* is capable of relatively few beam switches during a transmission slot, the base station 105-*b* may configure a same beam pair link to be used during two or more symbols of the transmission slot even though a different beam may have better channel quality. Likewise, if the UE 115-*b* is capable of additional beam switches, the base station 105-*b* may schedule additional different transmission and reception beams relative to what would be scheduled in cases where the UE 115-*b* has a relatively lower beam switch capability. In cases where the UE 115-*b* indicates a number of antenna set switches it is capable of supporting, the base station 105-*b* may perform scheduling based on the number of antenna set switches.

In some cases, at 430, the base station 105-*b* may transmit control information to the UE 115-*b* that indicates allocated resources for communications between the UE 115-*b* and the base station 105-*b*. At 435, the UE 115-*b* and base station 105-*b* may communicate using one or more transmission and reception beams in accordance with the control information and the indicated beam switch capability of the UE 115-*b*. In cases where the UE 115-*b* indicates a number of antenna set switches it is capable of supporting, the base station 105-*b* and UE 115-*b* may, additionally or alternatively, communicate using one or more transmission and reception antenna sets in accordance with the control information and the indicated antenna set switch capability of the UE 115-*b*.

Figure 5:
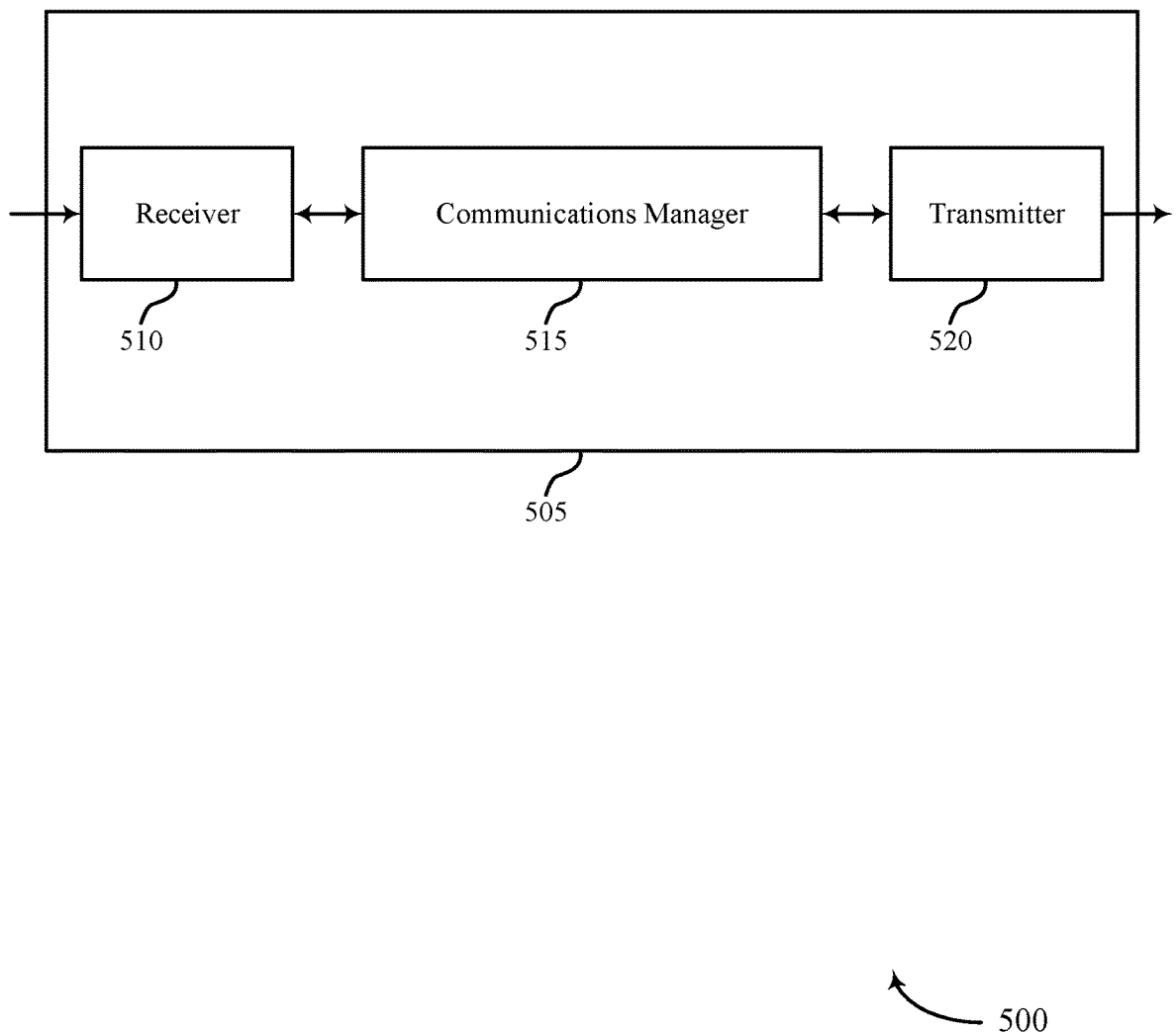
FIGS. 5 and 6 show diagrams of devices that support beam switch count in beamformed wireless communications in accordance with one or more aspects of the present disclosure.

FIG. 5 shows a block diagram 500 of a device 505 that supports beam switch count in beamformed wireless communications in accordance with one or more aspects of the present disclosure. The device 505 may be an example of aspects of a UE 115 as described herein. The device 505 may include a receiver 510, a communications manager 515, and a transmitter 520. The device 505 may also include a processor. Each of these components may be in communication with one another (e.g., via one or more buses).

The receiver 510 may receive information such as packets, user data, or control information associated with various information channels (e.g., control channels, data channels, and information related to beam switch count in beamformed wireless communications, etc.). Information may be passed on to other components of the device 505. The receiver 510 may be an example of aspects of the transceiver 820 described with reference to FIG. 8. The receiver 510 may utilize a single antenna or a set of antennas.

The communications manager 515 may establish a connection with a base station using beamformed wireless communications, determine a number of transmission and reception beam changes that the UE is capable of supporting during a transmission slot, where a transmission and reception beam change is based on a predetermined rule set, and transmit, to the base station, an indication of the number of transmission and reception beam changes that the UE is capable of supporting during the transmission slot. The communications manager 515 may be an example of aspects of the communications manager 810 described herein.

The communications manager 515, or its sub-components, may be implemented in hardware, code (e.g., software or firmware) executed by a processor, or any combination thereof. If implemented in code executed by a processor, the functions of the communications manager 515, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The communications manager 515, or its sub-components, may be physically located at various positions, including being distributed such that portions of functions are implemented at different physical locations by one or more physical components. In some examples, the communications manager 515, or its sub-components, may be a separate and distinct component in accordance with various aspects of the present disclosure. In some examples, the communications manager 515, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 520 may transmit signals generated by other components of the device 505. In some examples, the transmitter 520 may be collocated with a receiver 510 in a transceiver module. For example, the transmitter 520 may be an example of aspects of the transceiver 820 described with reference to FIG. 8. The transmitter 520 may utilize a single antenna or a set of antennas.

Figure 6:
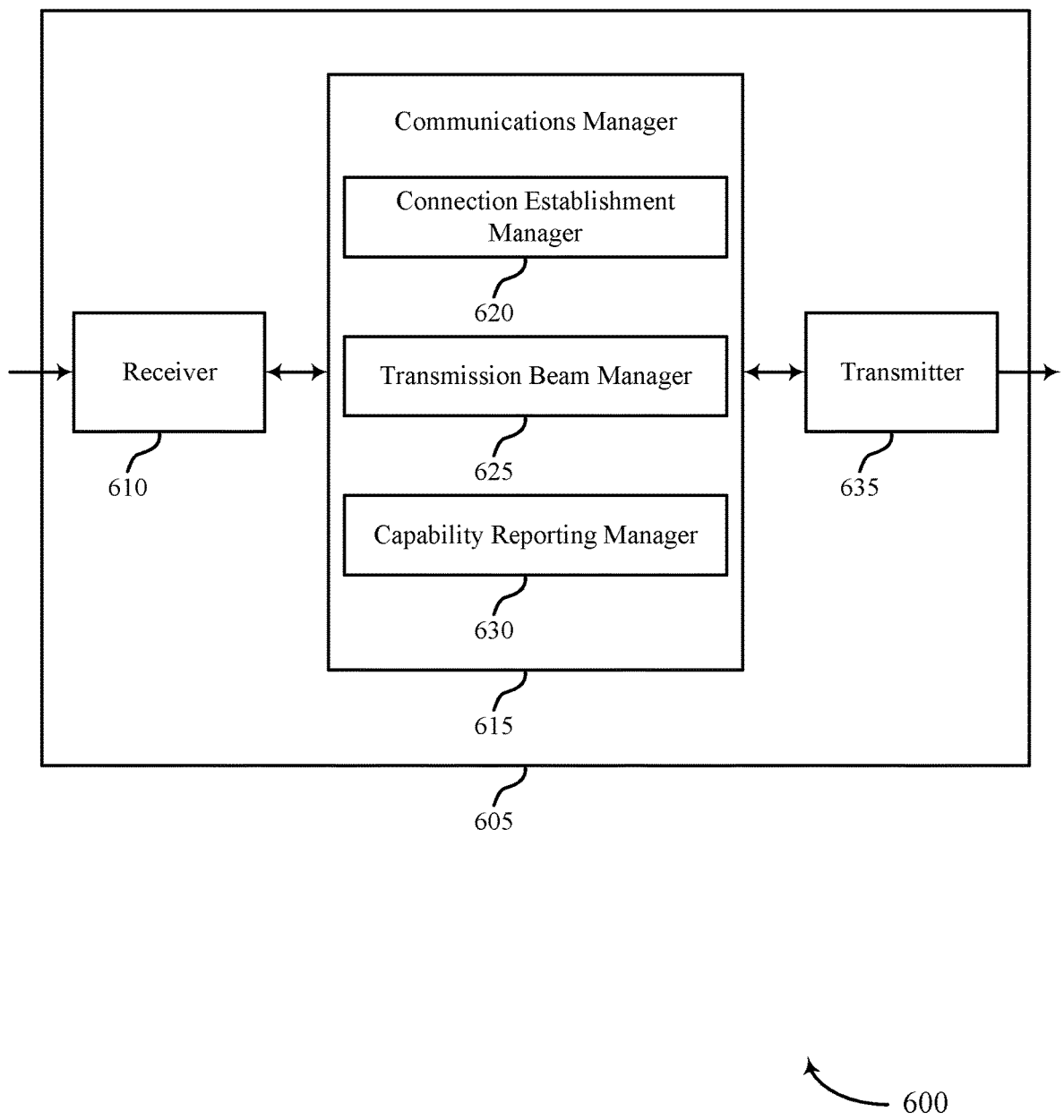

FIG. 6 shows a block diagram 600 of a device 605 that supports beam switch count in beamformed wireless communications in accordance with one or more aspects of the present disclosure. The device 605 may be an example of aspects of a device 505, or a UE 115 as described herein. The device 605 may include a receiver 610, a communications manager 615, and a transmitter 635. The device 605 may also include a processor. Each of these components may be in communication with one another (e.g., via one or more buses).

The receiver 610 may receive information such as packets, user data, or control information associated with various information channels (e.g., control channels, data channels, and information related to beam switch count in beamformed wireless communications, etc.). Information may be passed on to other components of the device 605. The receiver 610 may be an example of aspects of the transceiver 820 described with reference to FIG. 8. The receiver 610 may utilize a single antenna or a set of antennas.

The communications manager 615 may be an example of aspects of the communications manager 515 as described herein. The communications manager 615 may include a connection establishment manager 620, a transmission beam manager 625, and a capability reporting manager 630. The communications manager 615 may be an example of aspects of the communications manager 810 described herein.

The connection establishment manager 620 may establish a connection with a base station using beamformed wireless communications.

The transmission beam manager 625 may determine a number of transmission and reception beam changes that the UE is capable of supporting during a transmission slot, where a transmission and reception beam change is based on a predetermined rule set.

The capability reporting manager 630 may transmit, to the base station, an indication of the number of transmission and reception beam changes that the UE is capable of supporting during the transmission slot.

The transmitter 635 may transmit signals generated by other components of the device 605. In some examples, the transmitter 635 may be collocated with a receiver 610 in a transceiver module. For example, the transmitter 635 may be an example of aspects of the transceiver 820 described with reference to FIG. 8. The transmitter 635 may utilize a single antenna or a set of antennas.

Figure 7:
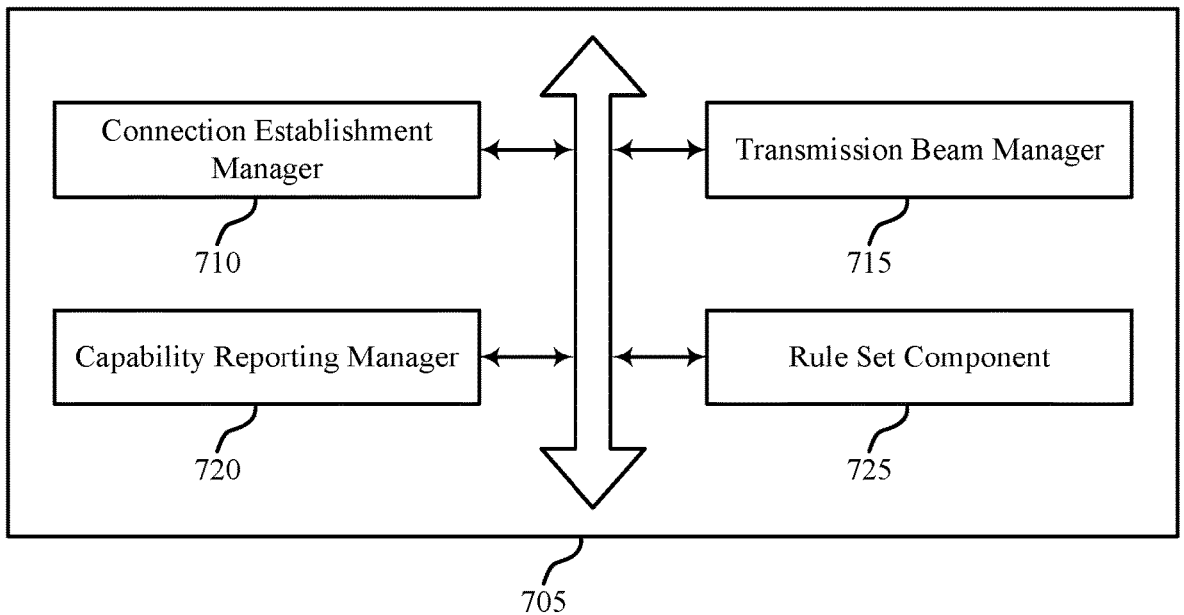
FIG. 7 shows a diagram of a communications manager that supports beam switch count in beamformed wireless communications in accordance with one or more aspects of the present disclosure.

FIG. 7 shows a block diagram 700 of a communications manager 705 that supports beam switch count in beamformed wireless communications in accordance with one or more aspects of the present disclosure. The communications manager 705 may be an example of aspects of a communications manager 515, a communications manager 615, or a communications manager 810 described herein. The communications manager 705 may include a connection establishment manager 710, a transmission beam manager 715, a capability reporting manager 720, and a rule set component 725. Each of these modules may communicate, directly or indirectly, with one another (e.g., via one or more buses).

The connection establishment manager 710 may establish a connection with a base station using beamformed wireless communications.

The transmission beam manager 715 may determine a number of transmission and reception beam changes that the UE is capable of supporting during a transmission slot, where a transmission and reception beam change is based on a predetermined rule set. In some cases, each transmission and reception beam change is associated with a different instance of a reference signal transmission or reception. In some cases, each transmission and reception beam change is associated with adjacent OFDM symbols within the transmission slot that have different QCL assumptions, different spatial relations, different transmission directions, or any combinations thereof. In some cases, each transmission and reception beam change is associated with a changed spatial domain filter. In some cases, the number of transmission and reception beam changes that the UE is capable of supporting during the transmission slot is provided per component carrier. In some cases, the number of transmission and reception beam changes that the UE is capable of supporting during the transmission slot is based on a SCS of each component carrier.

The capability reporting manager 720 may transmit, to the base station, an indication of the number of transmission and reception beam changes that the UE is capable of supporting during the transmission slot. In some examples, the capability reporting manager 720 may transmit a capability indication to the base station that includes the number of transmission and reception beam changes that the UE is capable of supporting during the transmission slot. In some examples, the capability reporting manager 720 may transmit a UE category indication to the base station, where the UE category indication is associated with a predetermined number of supported transmission and reception beam changes within the slot. In some examples, the capability reporting manager 720 may transmit, via RRC signaling, the number of transmission and reception beam changes that the UE is capable of supporting during the transmission slot. In some cases, the number of transmission and reception beam changes that the UE is capable of supporting during the transmission slot is selected from a set of available numbers of transmission and reception beam changes based on a capability of the UE. In some cases, the UE may indicate a number of transmit and receive antenna set switches that the UE is capable of supporting during the transmission slot.

The rule set component 725 may include one or more predetermined rules associated with a beam change at the UE. In some cases, the one or more predetermined rules may include one or more of:

- if the UE is configured with one or more (SSBs for reference signal measurements, the UE is assumed to apply a same spatial domain filter to receive all symbols carrying one SSB;
- if the UE is configured with a CSI-RS resource set with multiple repetitions, the UE is assumed to apply different spatial domain filters to receive different CSI-RS resources of different repetitions in the CSI-RS resource set;
- if the UE is configured with CSI-RS resource that has no TCI state configured or a SRS resource that has no spatial relation configured, the UE is assumed to change spatial domain filters to receive adjacent CSI-RS resources or transmit adjacent SRS resources;
- if two adjacent downlink symbols within the transmission slot have different configured or activated QCL assumptions, the UE is assumed to apply different spatial domain filters for the two adjacent downlink symbols;
- if two adjacent uplink symbols within the transmission slot have different configured or activated spatial relations, the UE is assumed to apply different spatial domain filters for the two adjacent uplink symbols;
- if two adjacent symbols within the transmission slot are uplink/downlink or downlink/uplink, the UE is assumed to apply different spatial domain filters for the two adjacent symbols;
- if two adjacent downlink symbols within the transmission slot have a same configured or activated QCL assumption, the UE is assumed to apply the same spatial domain filter for the two adjacent downlink symbols;
- if two adjacent uplink symbols within the slot have a same configured or activated spatial relation, the UE is assumed to apply the same spatial domain filter for the two adjacent uplink symbols; or
- any combinations thereof.

Figure 8:
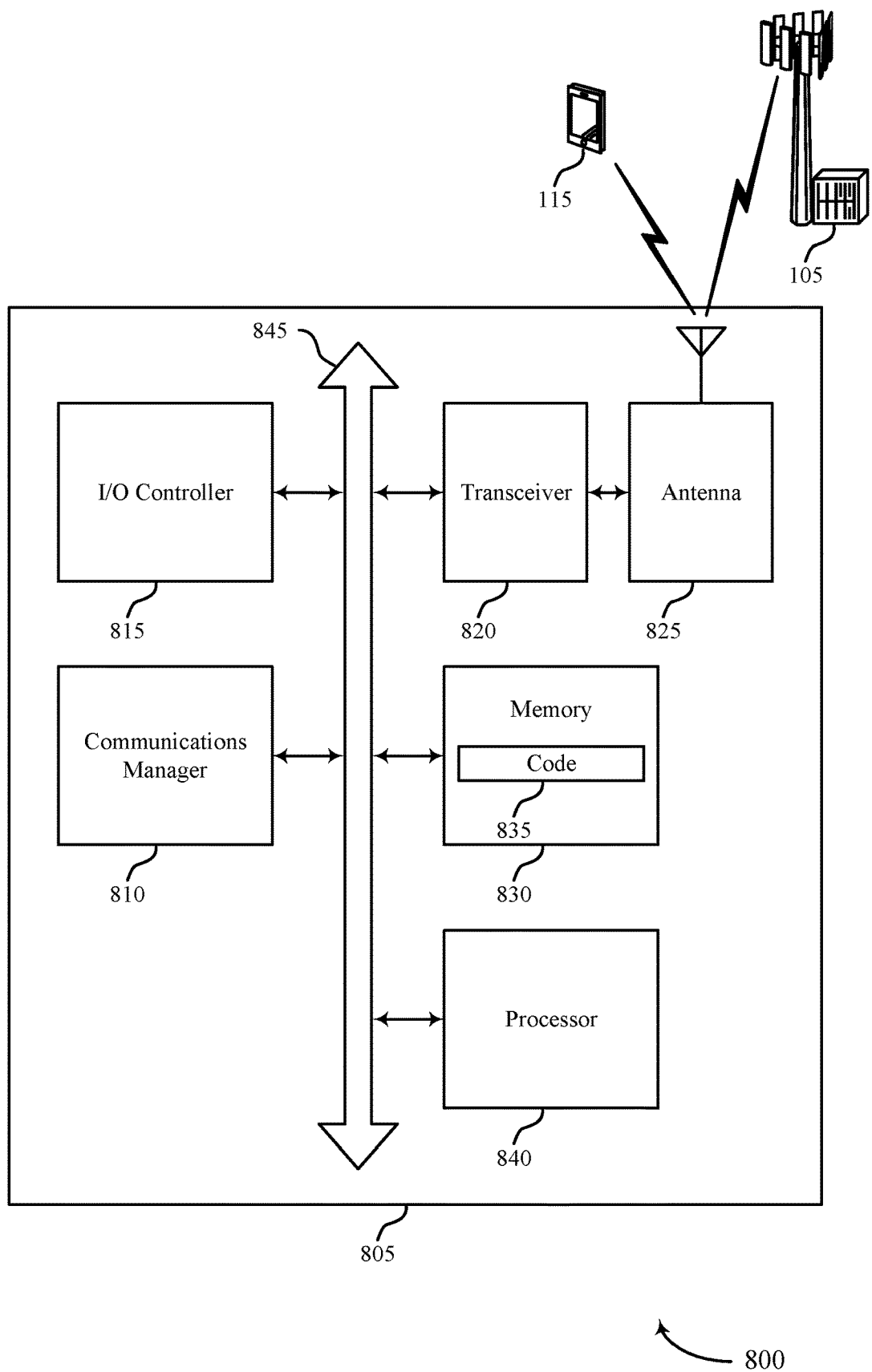
FIG. 8 shows a diagram of a system including a device that supports beam switch count in beamformed wireless communications in accordance with one or more aspects of the present disclosure.

FIG. 8 shows a diagram of a system 800 including a device 805 that supports beam switch count in beamformed wireless communications in accordance with one or more aspects of the present disclosure. The device 805 may be an example of or include the components of device 505, device 605, or a UE 115 as described herein. The device 805 may include components for bi-directional voice and data communications including components for transmitting and receiving communications, including a communications manager 810, an I/O controller 815, a transceiver 820, an antenna 825, memory 830, and a processor 840. These components may be in electronic communication via one or more buses (e.g., bus 845).

The communications manager 810 may establish a connection with a base station using beamformed wireless communications, determine a number of transmission and reception beam changes that the UE is capable of supporting during a transmission slot, where a transmission and reception beam change is based on a predetermined rule set, and transmit, to the base station, an indication of the number of transmission and reception beam changes that the UE is capable of supporting during the transmission slot.

The I/O controller 815 may manage input and output signals for the device 805. The I/O controller 815 may also manage peripherals not integrated into the device 805. In some cases, the I/O controller 815 may represent a physical connection or port to an external peripheral. In some cases, the I/O controller 815 may utilize an operating system such as iOS®, ANDROID®, MS-DOS®, MS-WINDOWS®, OS/2®, UNIX®, LINUX®, or another known operating system. In other cases, the I/O controller 815 may represent or interact with a modem, a keyboard, a mouse, a touchscreen, or a similar device. In some cases, the I/O controller 815 may be implemented as part of a processor. In some cases, a user may interact with the device 805 via the I/O controller 815 or via hardware components controlled by the I/O controller 815.

The transceiver 820 may communicate bi-directionally, via one or more antennas, wired, or wireless links as described herein. For example, the transceiver 820 may represent a wireless transceiver and may communicate bi-directionally with another wireless transceiver. The transceiver 820 may also include a modem to modulate the packets and provide the modulated packets to the antennas for transmission, and to demodulate packets received from the antennas.

In some cases, the wireless device may include a single antenna 825. However, in some cases the device may have more than one antenna 825, which may be capable of concurrently transmitting or receiving multiple wireless transmissions.

The memory 830 may include random-access memory (RAM) and read-only memory (ROM). The memory 830 may store computer-readable, computer-executable code 835 including instructions that, when executed, cause the processor to perform various functions described herein. In some cases, the memory 830 may contain, among other things, a basic I/O system (BIOS) which may control basic hardware or software operation such as the interaction with peripheral components or devices.

The processor 840 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In other cases, a memory controller may be integrated into the processor 840. The processor 840 may be configured to execute computer-readable instructions stored in a memory (e.g., the memory 830) to cause the device 805 to perform various functions (e.g., functions or tasks supporting beam switch count in beamformed wireless communications).

The code 835 may include instructions to implement aspects of the present disclosure, including instructions to support wireless communications. The code 835 may be stored in a non-transitory computer-readable medium such as system memory or other type of memory. In some cases, the code 835 may not be directly executable by the processor 840 but may cause a computer (e.g., when compiled and executed) to perform functions described herein.

Figure 9:
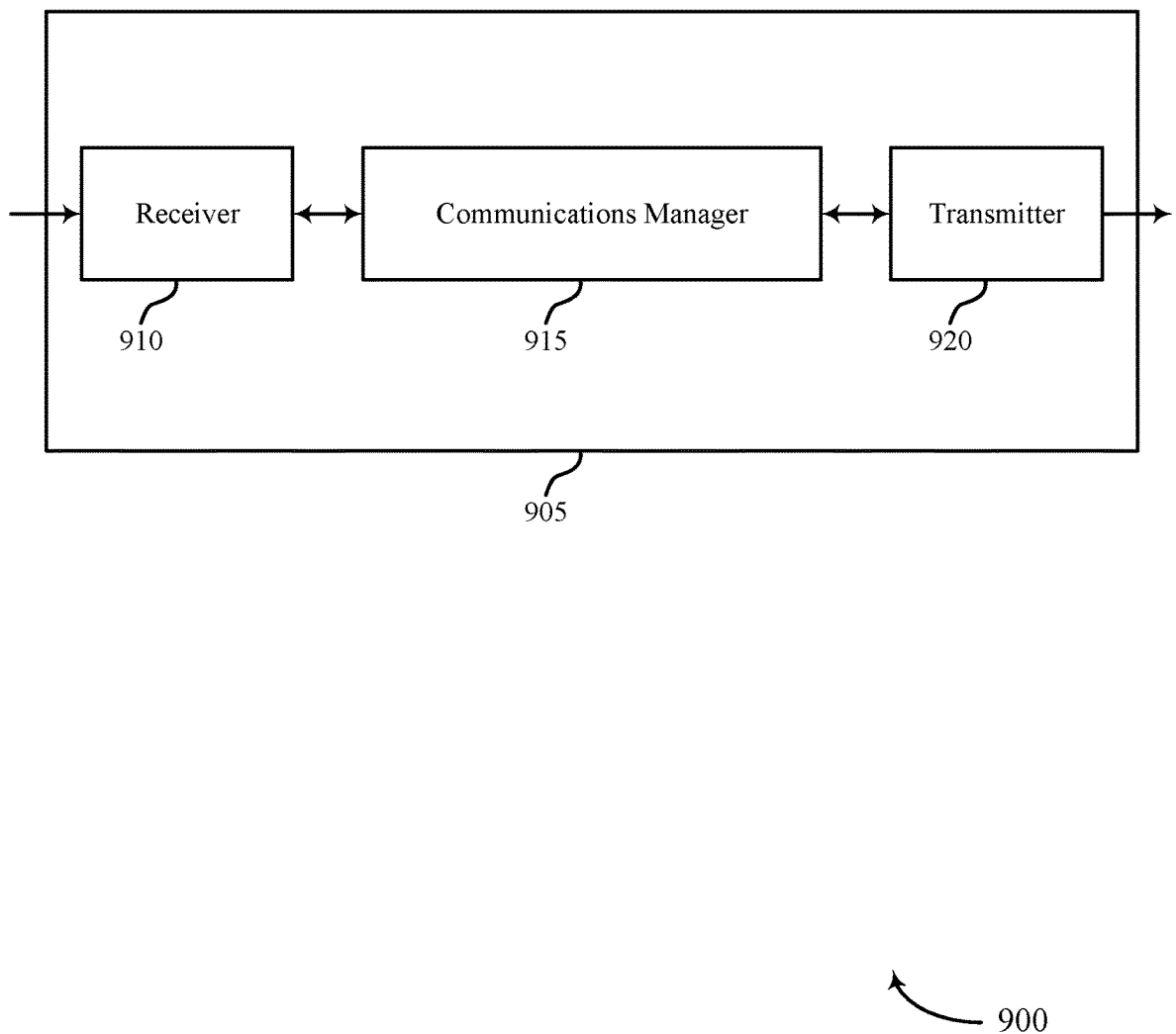
FIGS. 9 and 10 show diagrams of devices that support beam switch count in beamformed wireless communications in accordance with one or more aspects of the present disclosure.

FIG. 9 shows a block diagram 900 of a device 905 that supports beam switch count in beamformed wireless communications in accordance with one or more aspects of the present disclosure. The device 905 may be an example of aspects of a base station 105 as described herein. The device 905 may include a receiver 910, a communications manager 915, and a transmitter 920. The device 905 may also include a processor. Each of these components may be in communication with one another (e.g., via one or more buses).

The receiver 910 may receive information such as packets, user data, or control information associated with various information channels (e.g., control channels, data channels, and information related to beam switch count in beamformed wireless communications, etc.). Information may be passed on to other components of the device 905. The receiver 910 may be an example of aspects of the transceiver 1220 described with reference to FIG. 12. The receiver 910 may utilize a single antenna or a set of antennas.

The communications manager 915 may establish a connection with a UE using beamformed wireless communications, receive, from a UE, a capability indication of the UE, determine, based on the capability indication, of a number of transmission and reception beam changes that the UE is capable of supporting during a transmission slot, where a transmission and reception beam change is based on a predetermined rule set, and communicate with the UE using a number of transmission beams during the transmission slot, the number of transmission and reception beams based on the number of transmission and reception beam changes that the UE is capable of supporting during the transmission slot. The communications manager 915 may be an example of aspects of the communications manager 1210 described herein.

The communications manager 915, or its sub-components, may be implemented in hardware, code (e.g., software or firmware) executed by a processor, or any combination thereof. If implemented in code executed by a processor, the functions of the communications manager 915, or its sub-components may be executed by a general-purpose processor, a DSP, an ASIC, a FPGA or other programmable logic device, discrete gate or transistor logic, discrete hardware components, or any combination thereof designed to perform the functions described in the present disclosure.

The communications manager 915, or its sub-components, may be physically located at various positions, including being distributed such that portions of functions are implemented at different physical locations by one or more physical components. In some examples, the communications manager 915, or its sub-components, may be a separate and distinct component in accordance with various aspects of the present disclosure. In some examples, the communications manager 915, or its sub-components, may be combined with one or more other hardware components, including but not limited to an I/O component, a transceiver, a network server, another computing device, one or more other components described in the present disclosure, or a combination thereof in accordance with various aspects of the present disclosure.

The transmitter 920 may transmit signals generated by other components of the device 905. In some examples, the transmitter 920 may be collocated with a receiver 910 in a transceiver module. For example, the transmitter 920 may be an example of aspects of the transceiver 1220 described with reference to FIG. 12. The transmitter 920 may utilize a single antenna or a set of antennas.

Figure 10:
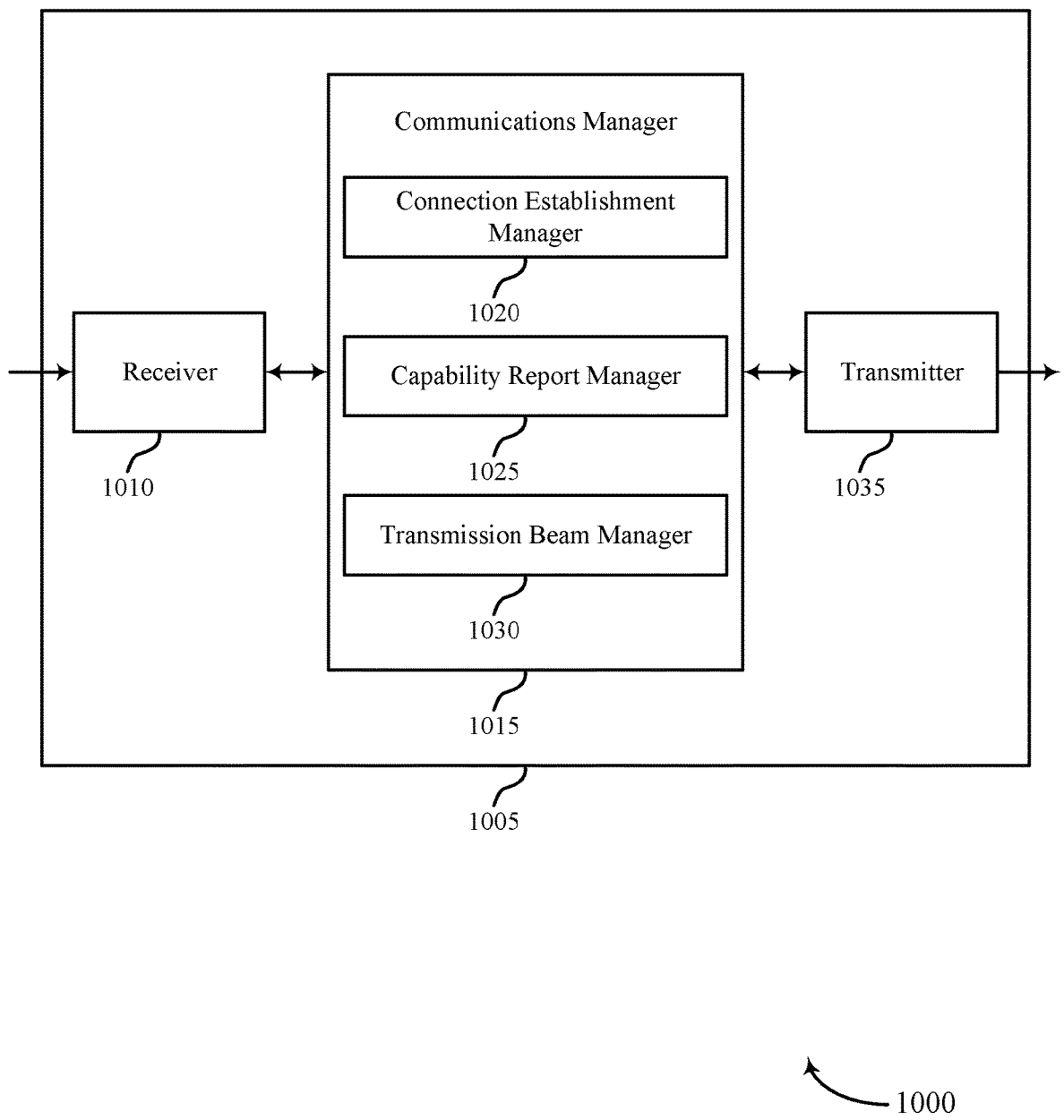

FIG. 10 shows a block diagram 1000 of a device 1005 that supports beam switch count in beamformed wireless communications in accordance with one or more aspects of the present disclosure. The device 1005 may be an example of aspects of a device 905, or a base station 105 as described herein. The device 1005 may include a receiver 1010, a communications manager 1015, and a transmitter 1035. The device 1005 may also include a processor. Each of these components may be in communication with one another (e.g., via one or more buses).

The receiver 1010 may receive information such as packets, user data, or control information associated with various information channels (e.g., control channels, data channels, and information related to beam switch count in beamformed wireless communications, etc.). Information may be passed on to other components of the device 1005. The receiver 1010 may be an example of aspects of the transceiver 1220 described with reference to FIG. 12. The receiver 1010 may utilize a single antenna or a set of antennas.

The communications manager 1015 may be an example of aspects of the communications manager 915 as described herein. The communications manager 1015 may include a connection establishment manager 1020, a capability report manager 1025, and a transmission beam manager 1030. The communications manager 1015 may be an example of aspects of the communications manager 1210 described herein.

The connection establishment manager 1020 may establish a connection with a UE using beamformed wireless communications. The capability report manager 1025 may receive, from a UE, a capability indication of the UE. The transmission beam manager 1030 may determine, based on the capability indication, of a number of transmission and reception beam changes that the UE is capable of supporting during a transmission slot, where a transmission and reception beam change is based on a predetermined rule set and communicate with the UE using a number of transmission and reception beams during the transmission slot, the number of transmission and reception beams based on the number of transmission and reception beam changes that the UE is capable of supporting during the transmission slot.

The transmitter 1035 may transmit signals generated by other components of the device 1005. In some examples, the transmitter 1035 may be collocated with a receiver 1010 in a transceiver module. For example, the transmitter 1035 may be an example of aspects of the transceiver 1220 described with reference to FIG. 12. The transmitter 1035 may utilize a single antenna or a set of antennas.

Figure 11:
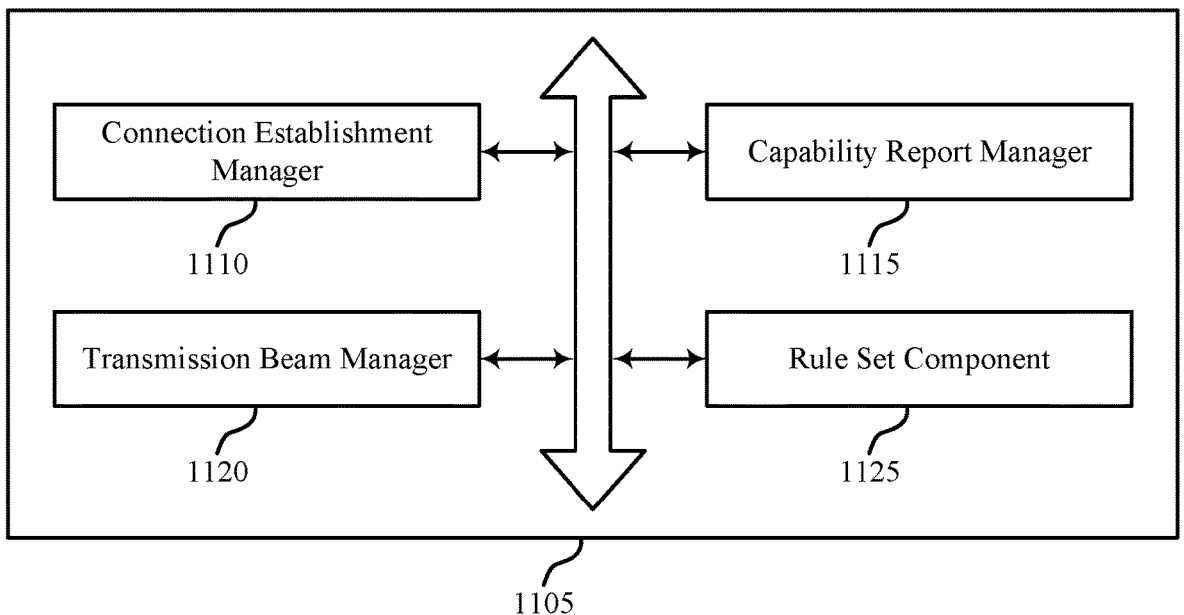
FIG. 11 shows a diagram of a communications manager that supports beam switch count in beamformed wireless communications in accordance with one or more aspects of the present disclosure.

FIG. 11 shows a block diagram 1100 of a communications manager 1105 that supports beam switch count in beamformed wireless communications in accordance with one or more aspects of the present disclosure. The communications manager 1105 may be an example of aspects of a communications manager 915, a communications manager 1015, or a communications manager 1210 described herein. The communications manager 1105 may include a connection establishment manager 1110, a capability report manager 1115, a transmission beam manager 1120, and a rule set component 1125. Each of these modules may communicate, directly or indirectly, with one another (e.g., via one or more buses).

The connection establishment manager 1110 may establish a connection with a UE using beamformed wireless communications.

The capability report manager 1115 may receive, from a UE, a capability indication of the UE. In some cases, the capability indication includes the number of transmission and reception beam changes that the UE is capable of supporting during the transmission slot. In some cases, the capability indication includes a UE category indication, where the UE category indication corresponds to the number of transmission and reception beam changes that the UE is capable of supporting during the transmission slot. In some cases, the capability indication is received via RRC signaling that includes the number of transmission and reception beam changes that the UE is capable of supporting during the transmission slot. In some cases, the number of transmission and reception beam changes that the UE is capable of supporting during the transmission slot is selected from a set of available numbers of transmission and reception beam changes.

The transmission beam manager 1120 may determine, based on the capability indication, of a number of transmission and reception beam changes that the UE is capable of supporting during a transmission slot, where a transmission and reception beam change is based on a predetermined rule set. In some examples, the transmission beam manager 1120 may communicate with the UE using a number of transmission and reception beams during the transmission slot, the number of transmission and reception beams based on the number of transmission and reception beam changes that the UE is capable of supporting during the transmission slot. In some examples, the transmission beam manager 1120 may determine a beam change when two or more transmission and reception beams of the number of transmission and reception beams are each associated with a different instance of a reference signal transmission or reception, two or more transmission and reception beams of the number of transmission and reception beams are each associated with different OFDM symbols within the transmission slot that have different QCL assumptions, different spatial relations, different transmission directions, or any combinations thereof. In some cases, each transmission and reception beam of the number of transmission and reception beams is associated with a different spatial domain filter. In some cases, the number of transmission and reception beam changes that the UE is capable of supporting during the transmission slot is provided per component carrier. In some cases, the number of transmission and reception beam changes that the UE is capable of supporting during the transmission slot is based on a sub-carrier spacing (SCS) of each component carrier. In some cases, the UE may indicate a number of transmit and receive antenna set switches that the UE is capable of supporting during the transmission slot.

The rule set component 1125 may include one or more predetermined rules associated with a beam change at the UE. In some cases, the one or more predetermined rules may include one or more of:

if the UE is configured with one or more (SSBs for reference signal measurements, the UE is assumed to apply a same spatial domain filter to receive all symbols carrying one SSB;

if the UE is configured with a CSI-RS resource set with multiple repetitions, the UE is assumed to apply different spatial domain filters to receive different CSI-RS resources of different repetitions in the CSI-RS resource set;

if the UE is configured with CSI-RS resource that has no TCI state configured or a SRS resource that has no spatial relation configured, the UE is assumed to change spatial domain filters to receive adjacent CSI-RS resources or transmit adjacent SRS resources;

if two adjacent downlink symbols within the transmission slot have different configured or activated QCL assumptions, the UE is assumed to apply different spatial domain filters for the two adjacent downlink symbols;

if two adjacent uplink symbols within the transmission slot have different configured or activated spatial relations, the UE is assumed to apply different spatial domain filters for the two adjacent uplink symbols;

if two adjacent symbols within the transmission slot are uplink/downlink or downlink/uplink, the UE is assumed to apply different spatial domain filters for the two adjacent symbols;

if two adjacent downlink symbols within the transmission slot have a same configured or activated QCL assumption, the UE is assumed to apply the same spatial domain filter for the two adjacent downlink symbols;

if two adjacent uplink symbols within the slot have a same configured or activated spatial relation, the UE is assumed to apply the same spatial domain filter for the two adjacent uplink symbols; or any combinations thereof.

Figure 12:
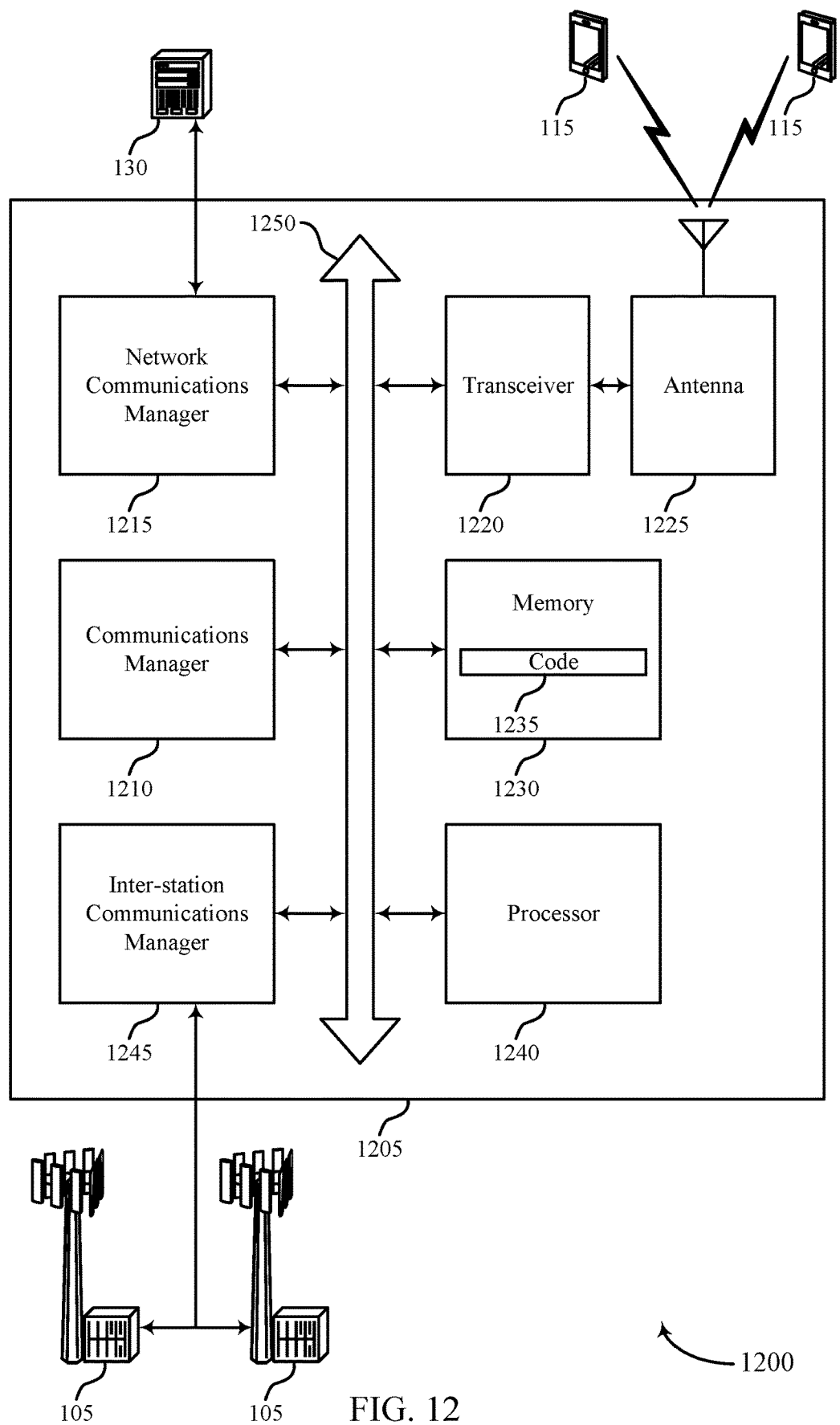
FIG. 12 shows a diagram of a system including a device that supports beam switch count in beamformed wireless communications in accordance with one or more aspects of the present disclosure.

FIG. 12 shows a diagram of a system 1200 including a device 1205 that supports beam switch count in beamformed wireless communications in accordance with one or more aspects of the present disclosure. The device 1205 may be an example of or include the components of device 905, device 1005, or a base station 105 as described herein. The device 1205 may include components for bi-directional voice and data communications including components for transmitting and receiving communications, including a communications manager 1210, a network communications manager 1215, a transceiver 1220, an antenna 1225, memory 1230, a processor 1240, and an inter-station communications manager 1245. These components may be in electronic communication via one or more buses (e.g., bus 1250).

The communications manager 1210 may establish a connection with a UE using beamformed wireless communications, receive, from a UE, a capability indication of the UE, determine, based on the capability indication, of a number of transmission and reception beam changes that the UE is capable of supporting during a transmission slot, where a transmission and reception beam change is based on a predetermined rule set, and communicate with the UE using a number of transmission and reception beams during the transmission slot, the number of transmission and reception beams based on the number of transmission and reception beam changes that the UE is capable of supporting during the transmission slot.

The network communications manager 1215 may manage communications with the core network (e.g., via one or more wired backhaul links). For example, the network communications manager 1215 may manage the transfer of data communications for client devices, such as one or more UEs 115.

The transceiver 1220 may communicate bi-directionally, via one or more antennas, wired, or wireless links as described herein. For example, the transceiver 1220 may represent a wireless transceiver and may communicate bi-directionally with another wireless transceiver. The transceiver 1220 may also include a modem to modulate the packets and provide the modulated packets to the antennas for transmission, and to demodulate packets received from the antennas.

In some cases, the wireless device may include a single antenna 1225. However, in some cases the device may have more than one antenna 1225, which may be capable of concurrently transmitting or receiving multiple wireless transmissions.

The memory 1230 may include RAM, ROM, or a combination thereof. The memory 1230 may store computer-readable code 1235 including instructions that, when executed by a processor (e.g., the processor 1240) cause the device to perform various functions described herein. In some cases, the memory 1230 may contain, among other things, a BIOS which may control basic hardware or software operation such as the interaction with peripheral components or devices.

The processor 1240 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In some cases, a memory controller may be integrated into processor 1240. The processor 1240 may be configured to execute computer-readable instructions stored in a memory (e.g., the memory 1230) to cause the device 1205 to perform various functions (e.g., functions or tasks supporting beam switch count in beamformed wireless communications).

The inter-station communications manager 1245 may manage communications with other base station 105, and may include a controller or scheduler for controlling communications with UEs 115 in cooperation with other base stations 105. For example, the inter-station communications manager 1245 may coordinate scheduling for transmissions to UEs 115 for various interference mitigation techniques such as beamforming or joint transmission. In some examples, the inter-station communications manager 1245 may provide an X2 interface within an LTE/LTE-A wireless communication network technology to provide communication between base stations 105.

The code 1235 may include instructions to implement aspects of the present disclosure, including instructions to support wireless communications. The code 1235 may be stored in a non-transitory computer-readable medium such as system memory or other type of memory. In some cases, the code 1235 may not be directly executable by the processor 1240 but may cause a computer (e.g., when compiled and executed) to perform functions described herein.

Figure 13:
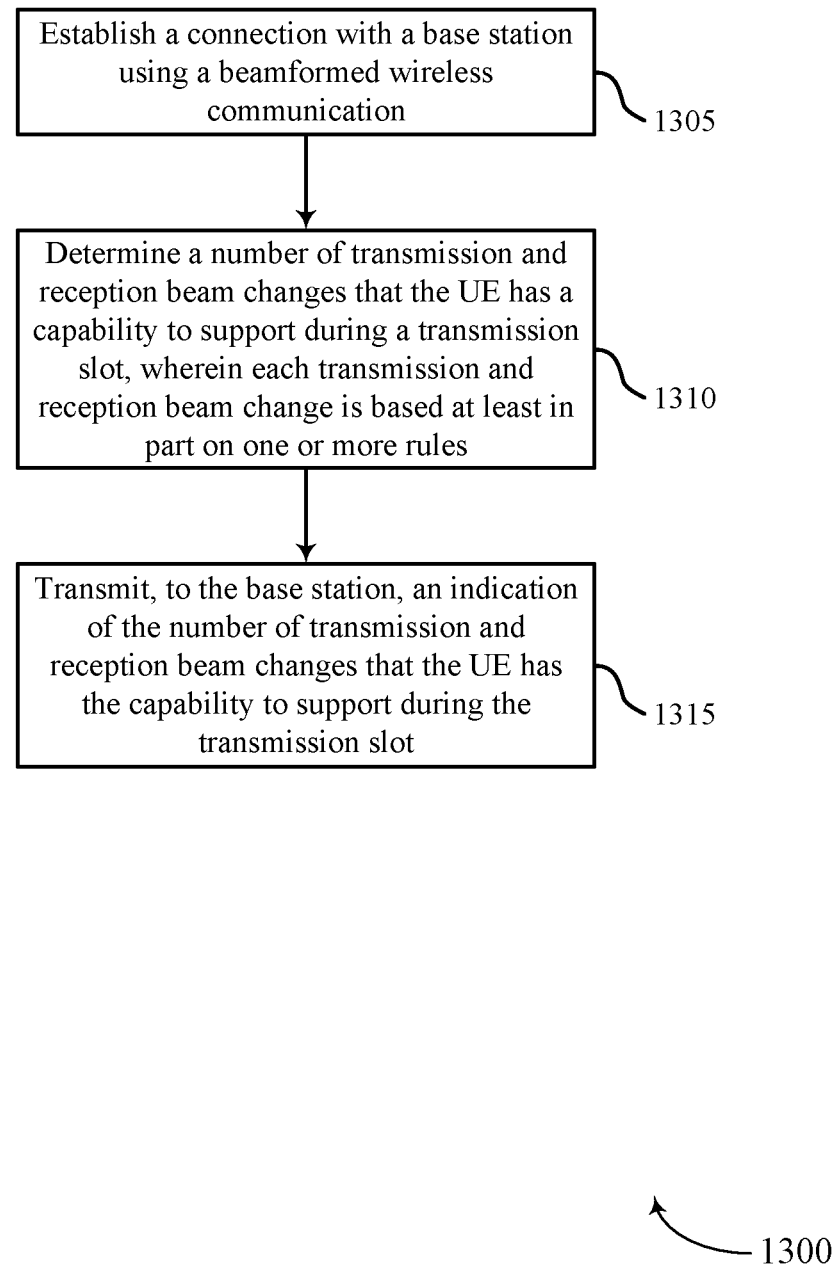
FIGS. 13 and 14 show flowcharts illustrating methods that support beam switch count in beamformed wireless communications in accordance with one or more aspects of the present disclosure.

FIG. 13 shows a flowchart illustrating a method 1300 that supports beam switch count in beamformed wireless communications in accordance with one or more aspects of the present disclosure. The operations of method 1300 may be implemented by a UE 115 or its components as described herein. For example, the operations of method 1300 may be performed by a communications manager as described with reference to FIGS. 5 through 8. In some examples, a UE may execute a set of instructions to control the functional elements of the UE to perform the functions described herein. Additionally or alternatively, a UE may perform aspects of the functions described herein using special-purpose hardware.

At 1305, the UE may establish a connection with a base station using beamformed wireless communications. The operations of 1305 may be performed according to the methods described herein. In some examples, aspects of the operations of 1305 may be performed by a connection establishment manager as described with reference to FIGS. 5 through 8.

At 1310, the UE may determine a number of transmission and reception beam changes that the UE is capable of supporting during a transmission slot, where a transmission and reception beam change is based on a predetermined rule set. The operations of 1310 may be performed according to the methods described herein. In some examples, aspects of the operations of 1310 may be performed by a transmission beam manager as described with reference to FIGS. 5 through 8.

At 1315, the UE may transmit, to the base station, an indication of the number of transmission and reception beam changes that the UE is capable of supporting during the transmission slot. The operations of 1315 may be performed according to the methods described herein. In some examples, aspects of the operations of 1315 may be performed by a capability reporting manager as described with reference to FIGS. 5 through 8.

Figure 14:
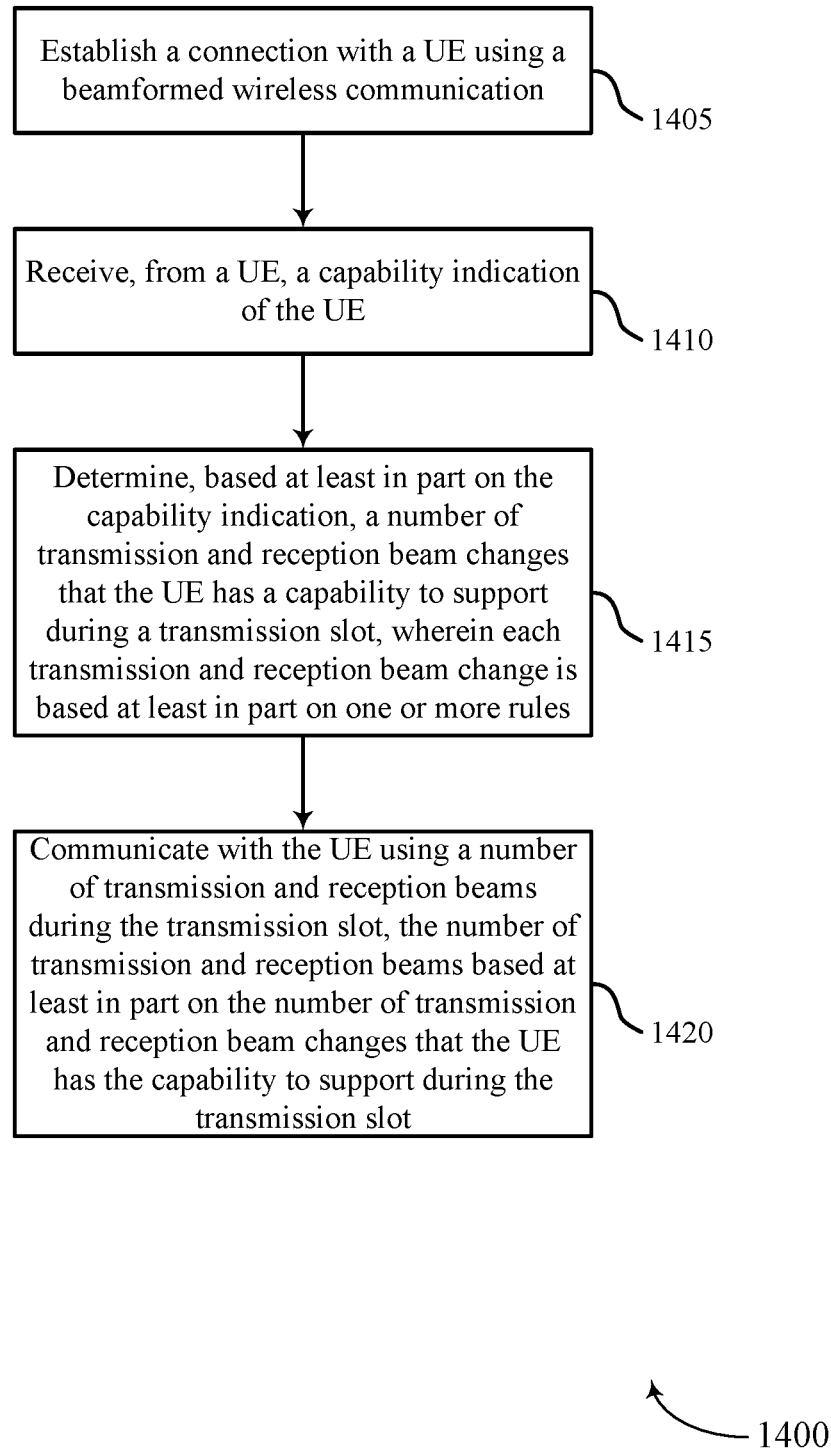

FIG. 14 shows a flowchart illustrating a method 1400 that supports beam switch count in beamformed wireless communications in accordance with one or more aspects of the present disclosure. The operations of method 1400 may be implemented by a base station 105 or its components as described herein. For example, the operations of method 1400 may be performed by a communications manager as described with reference to FIGS. 9 through 12. In some examples, a base station may execute a set of instructions to control the functional elements of the base station to perform the functions described herein. Additionally or alternatively, a base station may perform aspects of the functions described herein using special-purpose hardware.

At 1405, the base station may establish a connection with a UE using beamformed wireless communications. The operations of 1405 may be performed according to the methods described herein. In some examples, aspects of the operations of 1405 may be performed by a connection establishment manager as described with reference to FIGS. 9 through 12.

At 1410, the base station may receive, from a UE, a capability indication of the UE. The operations of 1410 may be performed according to the methods described herein. In some examples, aspects of the operations of 1410 may be performed by a capability report manager as described with reference to FIGS. 9 through 12.

At 1415, the base station may determine, based on the capability indication, of a number of transmission and reception beam changes that the UE is capable of supporting during a transmission slot, where a transmission and reception beam change is based on a predetermined rule set. The operations of 1415 may be performed according to the methods described herein. In some examples, aspects of the operations of 1415 may be performed by a transmission beam manager as described with reference to FIGS. 9 through 12.

At 1420, the base station may communicate with the UE using a number of transmission and reception beams during the transmission slot, the number of transmission and reception beams based on the number of transmission and reception beam changes that the UE is capable of supporting during the transmission slot. The operations of 1420 may be performed according to the methods described herein. In some examples, aspects of the operations of 1420 may be performed by a transmission beam manager as described with reference to FIGS. 9 through 12.

It should be noted that the methods described herein describe possible implementations, and that the operations and the steps may be rearranged or otherwise modified and that other implementations are possible. Further, aspects from two or more of the methods may be combined.

Techniques described herein may be used for various wireless communications systems such as CDMA, TDMA, FDMA, OFDMA, single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs with service subscriptions with the network provider. A small cell may be associated with a lower-powered base station, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative operations and modules described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary operation that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication, comprising:
    establishing, at a user equipment (UE), a connection with a base station using a beamformed wireless communication;
    determining a number of transmission and reception beam changes that the UE has a capability to support during a slot, wherein each transmission and reception beam change of the number of transmission and reception beam changes is associated with a changed spatial domain filter, and wherein each transmission and reception beam change is based at least in part on one or more rules, the one or more rules comprising:
        if the UE is configured with one or more synchronization signal blocks (SSBs) for reference signal measurements, the UE is assumed to apply a same spatial domain filter to receive all symbols carrying one SSB,
        if the UE is configured with a channel state information reference signal (CSI-RS) resource set with multiple repetitions, the UE is assumed to apply different spatial domain filters to receive different CSI-RS resources of different repetitions in the CSI-RS resource set,
        if the UE is configured with a CSI-RS resource that has no transmission configuration indication (TCI) state configured or a sounding reference signal (SRS) resource that has no spatial relation configured, the UE is assumed to change spatial domain filters to receive adjacent CSI-RS resources or transmit adjacent SRS resources,
        if two adjacent downlink symbols within the slot have different configured or activated quasi-co-location (QCL) assumptions, the UE is assumed to apply different spatial domain filters for the two adjacent downlink symbols,
        if two adjacent uplink symbols within the slot have different configured or activated spatial relations, the UE is assumed to apply different spatial domain filters for the two adjacent uplink symbols,
        if two adjacent symbols within the slot are uplink/downlink or downlink/uplink, the UE is assumed to apply different spatial domain filters for the two adjacent symbols,
        if two adjacent downlink symbols within the slot have a same configured or activated QCL assumption, the UE is assumed to apply the same spatial domain filter for the two adjacent downlink symbols,
        if two adjacent uplink symbols within the slot have a same configured or activated spatial relation, the UE is assumed to apply the same spatial domain filter for the two adjacent uplink symbols, or
        any combinations thereof; and
    transmitting, to the base station, an indication of the number of transmission and reception beam changes that the UE has the capability to support during the slot.

2. The method of claim 1, wherein each transmission and reception beam change of the number of transmission and reception beam changes is associated with a different instance of a reference signal transmission or reception.

3. The method of claim 1, wherein each transmission and reception beam change of the number of transmission and reception beam changes is associated with adjacent orthogonal frequency division multiplexing (OFDM) symbols within the slot that have different quasi-co-location (QCL) assumptions, different spatial relations, different transmission directions, or any combinations thereof.

4. The method of claim 1, wherein the transmitting the indication comprises:
    transmitting a capability indication to the base station that includes the number of transmission and reception beam changes that the UE has the capability to support during the slot.

5. The method of claim 1, wherein the transmitting the indication of the number of transmission and reception beam changes that the UE has the capability to support during the slot comprises:
    transmitting, via radio resource control (RRC) signaling, the number of transmission and reception beam changes that the UE has the capability to support during the slot.

6. The method of claim 1, wherein the number of transmission and reception beam changes that the UE has the capability to support during the slot is provided per component carrier.

7. The method of claim 6, wherein the number of transmission and reception beam changes that the UE has the capability to support during the slot is based at least in part on a sub-carrier spacing (SCS) of each component carrier.

8. A method for wireless communication, comprising:
    establishing, at a user equipment (UE), a connection with a base station using a beamformed wireless communication;

determining a number of transmission and reception beam changes that the UE has a capability to support during a slot, wherein each transmission and reception beam change is based at least in part on one or more rules; and transmitting a UE category indication to the base station, wherein the UE category indication is associated with the number of supported transmission and reception beam changes that the UE has the capability to support within the slot.

9. A method for wireless communication, comprising:

establishing, at a user equipment (UE), a connection with a base station using a beamformed wireless communication;

determining a number of transmission and reception beam changes that the UE has a capability to support during a slot, wherein each transmission and reception beam change of the number of transmission and reception beam changes is based at least in part on one or more rules, wherein the number of transmission and reception beam changes that the UE has the capability to support during the slot is selected from a set of available numbers of transmission and reception beam changes based at least in part on a capability of the UE; and transmitting, to the base station, an indication of the number of transmission and reception beam changes that the UE has the capability to support during the slot.

10. A method for wireless communication, comprising:

establishing, at a user equipment (UE), a connection with a base station using a beamformed wireless communication;

determining a number of transmission and reception antenna set changes that the UE has a capability to support during a slot, wherein each transmission and reception antenna set change of the number of transmission and reception beam changes is based at least in part on one or more rules; and transmitting, to the base station, an indication of the number of transmission and reception antenna set changes that the UE has the capability to support during the slot.

11. The method of claim 10, wherein each transmission and reception antenna set change of the number of transmission and reception antenna set changes is associated with a different instance of a reference signal transmission or reception.

12. The method of claim 10, wherein each transmission and reception antenna set change of the number of transmission and reception antenna set changes is associated with adjacent orthogonal frequency division multiplexing (OFDM) symbols within the slot that have different quasi-co-location (QCL) assumptions, different spatial relations, different transmission directions, or any combinations thereof.

13. The method of claim 10, wherein each transmission and reception antenna set change of the number of transmission and reception antenna set changes is associated with a changed spatial domain filter.

14. The method of claim 13, wherein the one or more rules comprise:

if the UE is configured with one or more synchronization signal blocks (SSBs) for reference signal measurements, the UE is assumed to apply a same spatial domain filter to receive all symbols carrying one SSB, if the UE is configured with a channel state information reference signal (CSI-RS) resource set with multiple repetitions, the UE is assumed to apply different spatial domain filters to receive different CSI-RS resources of different repetitions in the CSI-RS resource set, if the UE is configured with a CSI-RS resource that has no transmission configuration indication (TCI) state configured or a sounding reference signal (SRS) resource that has no spatial relation configured, the UE is assumed to change spatial domain filters to receive adjacent CSI-RS resources or transmit adjacent SRS resources, if two adjacent downlink symbols within the slot have different configured or activated quasi-co-location (QCL) assumptions, the UE is assumed to apply different spatial domain filters for the two adjacent downlink symbols, if two adjacent uplink symbols within the slot have different configured or activated spatial relations, the UE is assumed to apply different spatial domain filters for the two adjacent uplink symbols, if two adjacent symbols within the slot are uplink/downlink or downlink/uplink, the UE is assumed to apply different spatial domain filters for the two adjacent symbols, if two adjacent downlink symbols within the slot have a same configured or activated QCL assumption, the UE is assumed to apply the same spatial domain filter for the two adjacent downlink symbols, if two adjacent uplink symbols within the slot have a same configured or activated spatial relation, the UE is assumed to apply the same spatial domain filter for the two adjacent uplink symbols, or any combinations thereof.

15. The method of claim 10, wherein the transmitting the indication comprises:

transmitting a capability indication to the base station that includes the number of transmission and reception antenna set changes that the UE has the capability to support during the slot.

16. The method of claim 10, wherein the transmitting the indication comprises:

transmitting a UE category indication to the base station, wherein the UE category indication is associated with a number of supported transmission and reception antenna set changes within the slot.

17. The method of claim 10, wherein the transmitting the indication comprises:

transmitting, via radio resource control (RRC) signaling, the number of transmission and reception antenna set changes that the UE has the capability to support during the slot.

18. The method of claim 10, wherein the number of transmission and reception antenna set changes that the UE has the capability to support during the slot is provided per component carrier.

19. The method of claim 18, wherein the number of transmission and reception antenna set changes that the UE has the capability to support during the slot is based at least in part on a sub-carrier spacing (SCS) of each component carrier.

20. The method of claim 10, wherein the number of transmission and reception antenna set changes that the UE has the capability to support during the slot is selected from a set of available numbers of transmission and reception antenna set changes based at least in part on a capability of the UE.

21. A method for wireless communication, comprising:
- establishing, at a base station, a connection with a user equipment (UE) using a beamformed wireless communication;
- receiving, from the UE, a capability indication of the UE;
- determining, based at least in part on the capability indication, a number of transmission and reception beam changes that the UE has a capability to support during a slot, wherein each transmission and reception beam change of the number of transmission and reception beam changes is based at least in part on one or more rules; and
- communicating with the UE using a number of transmission and reception beams during the slot, the number of transmission and reception beams based at least in part on the number of transmission and reception beam changes that the UE has the capability to support during the slot.

22. The method of claim 21, wherein:
- two or more transmission and reception beams of the number of transmission and reception beams are each associated with a different instance of a reference signal transmission or reception, different orthogonal frequency division multiplexing (OFDM) symbols within the slot that have different quasi-co-location (QCL) assumptions, different spatial relations, different transmission directions, or any combinations thereof.

23. The method of claim 21, wherein each transmission and reception beam of the number of transmission and reception beams is associated with a different spatial domain filter.

24. The method of claim 23, wherein the one or more rules comprise:
- if the UE is configured with one or more synchronization signal blocks (SSBs) for reference signal measurements, the UE is assumed to apply a same spatial domain filter to receive all symbols carrying one SSB,
- if the UE is configured with a channel state information reference signal (CSI-RS) resource set with multiple repetitions, the UE is assumed to apply different spatial domain filters to receive different CSI-RS resources of different repetitions in the CSI-RS resource set,
- if the UE is configured with a CSI-RS resource that has no transmission configuration indication (TCI) state configured or a sounding reference signal (SRS) resource that has no spatial relation configured, the UE is assumed to change spatial domain filters to receive adjacent CSI-RS resources or transmit adjacent SRS resources,
- if two adjacent downlink symbols within the slot have different configured or activated quasi-co-location (QCL) assumptions, the UE is assumed to apply different spatial domain filters for the two adjacent downlink symbols,
- if two adjacent uplink symbols within the slot have different configured or activated spatial relations, the UE is assumed to apply different spatial domain filters for the two adjacent uplink symbols,
- if two adjacent symbols within the slot are uplink/downlink or downlink/uplink, the UE is assumed to apply different spatial domain filters for the two adjacent symbols,
- if two adjacent downlink symbols within the slot have a same configured or activated QCL assumption, the UE is assumed to apply the same spatial domain filter for the two adjacent downlink symbols,
- if two adjacent uplink symbols within the slot have a same configured or activated spatial relation, the UE is assumed to apply the same spatial domain filter for the two adjacent uplink symbols, or
- any combinations thereof.

25. A method for wireless communication, comprising:
- establishing, at a base station, a connection with a user equipment (UE) using a beamformed wireless communication;
- receiving, from the UE, a capability indication of the UE;
- determining, based at least in part on the capability indication, of a number of transmission and reception antenna set changes that the UE has a capability to support during a slot, wherein each transmission and reception antenna set change of the number of transmission and reception antenna set changes is based at least in part on one or more rules; and
- communicating with the UE using a number of transmission and reception antenna sets during the slot, the number of transmission and reception antenna sets based at least in part on the number of transmission and reception antenna set changes that the UE has the capability to support during the slot.

26. The method of claim 25, wherein:
- two or more transmission and reception antenna sets of the number of transmission and reception antenna sets are each associated with a different instance of a reference signal transmission or reception, different orthogonal frequency division multiplexing (OFDM) symbols within the slot that have different quasi-co-location (QCL) assumptions, different spatial relations, different transmission directions, or any combinations thereof.

27. The method of claim 25, wherein each transmission and reception antenna set of the number of transmission and reception antenna sets is associated with a different spatial domain filter.

28. The method of claim 27, wherein the one or more rules comprise:
- if the UE is configured with one or more synchronization signal blocks (SSBs) for reference signal measurements, the UE is assumed to apply a same spatial domain filter to receive all symbols carrying one SSB,
- if the UE is configured with a channel state information reference signal (CSI-RS) resource set with multiple repetitions, the UE is assumed to apply different spatial domain filters to receive different CSI-RS resources of different repetitions in the CSI-RS resource set,
- if the UE is configured with a CSI-RS resource that has no transmission configuration indication (TCI) state configured or a sounding reference signal (SRS) resource that has no spatial relation configured, the UE is assumed to change spatial domain filters to receive adjacent CSI-RS resources or transmit adjacent SRS resources,
- if two adjacent downlink symbols within the slot have different configured or activated quasi-co-location (QCL) assumptions, the UE is assumed to apply different spatial domain filters for the two adjacent downlink symbols,
- if two adjacent uplink symbols within the slot have different configured or activated spatial relations, the UE is assumed to apply different spatial domain filters for the two adjacent uplink symbols, if two adjacent symbols within the slot are uplink/downlink or downlink/uplink, the UE is assumed to apply different spatial domain filters for the two adjacent symbols, if two adjacent downlink symbols within the slot have a same configured or activated QCL assumption, the UE is assumed to apply the same spatial domain filter for the two adjacent downlink symbols, if two adjacent uplink symbols within the slot have a same configured or activated spatial relation, the UE is assumed to apply the same spatial domain filter for the two adjacent uplink symbols, or any combinations thereof.

29. An apparatus for wireless communication, comprising:
 a processor; and
 memory coupled to the processor, the processor and memory configured to:
  establish, at a user equipment (UE), a connection with a base station using a beamformed wireless communication;
  determine a number of transmission and reception beam changes that the UE has a capability to support during a slot, wherein each transmission and reception beam change of the number of transmission and reception beam changes is associated with a changed spatial domain filter, and wherein each transmission and reception beam change is based at least in part on one or more rules, the one or more rules comprising:
   if the UE is configured with one or more synchronization signal blocks (SSBs) for reference signal measurements, the UE is assumed to apply a same spatial domain filter to receive all symbols carrying one SSB,
   if the UE is configured with a channel state information reference signal (CSI-RS) resource set with multiple repetitions, the UE is assumed to apply different spatial domain filters to receive different CSI-RS resources of different repetitions in the CSI-RS resource set,
   if the UE is configured with a CSI-RS resource that has no transmission configuration indication (TCI) state configured or a sounding reference signal (SRS) resource that has no spatial relation configured, the UE is assumed to change spatial domain filters to receive adjacent CSI-RS resources or transmit adjacent SRS resources,
   if two adjacent downlink symbols within the slot have different configured or activated quasi-co-location (QCL) assumptions, the UE is assumed to apply different spatial domain filters for the two adjacent downlink symbols,
   if two adjacent uplink symbols within the slot have different configured or activated spatial relations, the UE is assumed to apply different spatial domain filters for the two adjacent uplink symbols,
   if two adjacent symbols within the slot are uplink/downlink or downlink/uplink, the UE is assumed to apply different spatial domain filters for the two adjacent symbols,
   if two adjacent downlink symbols within the slot have a same configured or activated QCL assumption, the UE is assumed to apply the same spatial domain filter for the two adjacent downlink symbols,
   if two adjacent uplink symbols within the slot have a same configured or activated spatial relation, the UE is assumed to apply the same spatial domain filter for the two adjacent uplink symbols, or
   any combinations thereof; and
  transmit, to the base station, an indication of the number of transmission and reception beam changes that the UE has the capability to support during the slot.

30. The apparatus of claim 29, wherein each transmission and reception beam change of the number of transmission and reception beam changes is associated with a different instance of a reference signal transmission or reception, adjacent orthogonal frequency division multiplexing (OFDM) symbols within the transmission slot that have different quasi-co-location (QCL) assumptions, different spatial relations, different transmission directions, or any combinations thereof.

31. The apparatus of claim 29, wherein, to transmit the indication, the processor and memory are configured to:
 transmit a capability indication to the base station that includes the number of transmission and reception beam changes that the UE has the capability to support during the slot.

32. The apparatus of claim 29, wherein, to transmit the indication of the number of transmission and reception beam changes that the UE has the capability to support during the slot, the processor and memory are configured to:
 transmit, via radio resource control (RRC) signaling, the number of transmission and reception beam changes that the UE has the capability to support during the slot.

33. The apparatus of claim 29, wherein the number of transmission and reception beam changes that the UE has the capability to support during the slot is provided per component carrier and is based at least in part on a subcarrier spacing (SCS) of each component carrier.

34. An apparatus for wireless communication, comprising:
 a processor; and
 memory coupled to the processor, the processor and memory configured to:
  establish, at a user equipment (UE), a connection with a base station using a beamformed wireless communication;
  determine a number of transmission and reception beam changes that the UE has a capability to support during a slot, wherein each transmission and reception beam change is based at least in part on one or more rules; and
  transmit a UE category indication to the base station, wherein the UE category indication is associated with the number of supported transmission and reception beam changes that the UE has the capability to support within the slot.

35. An apparatus for wireless communication, comprising:
 a processor; and
 memory coupled to the processor, the processor and memory configured to:
  establish, at a user equipment (UE), a connection with a base station using a beamformed wireless communication;
  determine a number of transmission and reception beam changes that the UE has a capability to support during a slot, wherein each transmission and reception beam change of the number of transmission and reception beam changes is based at least in part on one or more rules, wherein the number of transmission and reception beam changes that the UE has the capability to support during the slot is selected from a set of available numbers of transmission and reception beam changes based at least in part on a capability of the UE; and transmit, to the base station, an indication of the number of transmission and reception beam changes that the UE has the capability to support during the slot.

36. An apparatus for wireless communication, comprising:
a processor; and
memory coupled to the processor, the processor and memory configured to:
establish, at a user equipment (UE), a connection with a base station using a beamformed wireless communication;
determine a number of transmission and reception antenna set changes that the UE has a capability to support during a slot, wherein each transmission and reception antenna set change of the number of transmission and reception beam changes is based at least in part on one or more rules; and
transmit, to the base station, an indication of the number of transmission and reception antenna set changes that the UE has the capability to support during the slot.

37. The apparatus of claim 36, wherein each transmission and reception antenna set change of the number of transmission and reception antenna set changes is associated with a different instance of a reference signal transmission or reception, is associated with adjacent orthogonal frequency division multiplexing (OFDM) symbols within the slot that have different quasi-co-location (QCL) assumptions, different spatial relations, different transmission directions, is associated with a changed spatial domain filter, or any combinations thereof.

38. The apparatus of claim 37, wherein the one or more rules comprise:
if the UE is configured with one or more synchronization signal blocks (SSBs) for reference signal measurements, the UE is assumed to apply a same spatial domain filter to receive all symbols carrying one SSB,
if the UE is configured with a channel state information reference signal (CSI-RS) resource set with multiple repetitions, the UE is assumed to apply different spatial domain filters to receive different CSI-RS resources of different repetitions in the CSI-RS resource set,
if the UE is configured with a CSI-RS resource that has no transmission configuration indication (TCI) state configured or a sounding reference signal (SRS) resource that has no spatial relation configured, the UE is assumed to change spatial domain filters to receive adjacent CSI-RS resources or transmit adjacent SRS resources,
if two adjacent downlink symbols within the slot have different configured or activated quasi-co-location (QCL) assumptions, the UE is assumed to apply different spatial domain filters for the two adjacent downlink symbols,
if two adjacent uplink symbols within the slot have different configured or activated spatial relations, the UE is assumed to apply different spatial domain filters for the two adjacent uplink symbols,
if two adjacent symbols within the slot are uplink/downlink or downlink/uplink, the UE is assumed to apply different spatial domain filters for the two adjacent symbols,
if two adjacent downlink symbols within the slot have a same configured or activated QCL assumption, the UE is assumed to apply the same spatial domain filter for the two adjacent downlink symbols,
if two adjacent uplink symbols within the slot have a same configured or activated spatial relation, the UE is assumed to apply the same spatial domain filter for the two adjacent uplink symbols, or
any combinations thereof.

39. The apparatus of claim 36, wherein, to transmit the indication, the processor and memory are configured to:
transmit a capability indication to the base station that includes the number of transmission and reception antenna set changes that the UE has the capability to support during the slot;
transmit a UE category indication to the base station, wherein the UE category indication is associated with a number of supported transmission and reception antenna set changes within the slot;
transmit, via radio resource control (RRC) signaling, the number of transmission and reception antenna set changes that the UE has the capability to support during the slot; or
any combination thereof.

40. The apparatus of claim 36, wherein the number of transmission and reception antenna set changes that the UE has the capability to support during the slot is provided per component carrier and is based at least in part on a subcarrier spacing (SCS) of each component carrier.

41. The apparatus of claim 36, wherein the number of transmission and reception antenna set changes that the UE has the capability to support during the slot is selected from a set of available numbers of transmission and reception antenna set changes based at least in part on a capability of the UE.

42. An apparatus for wireless communication, comprising:
a processor; and
memory coupled to the processor, the processor and memory configured to:
establish, at a base station, a connection with a user equipment (UE) using a beamformed wireless communication;
receive, from the UE, a capability indication of the UE;
determine, based at least in part on the capability indication, a number of transmission and reception beam changes that the UE has a capability to support during a slot, wherein each transmission and reception beam change of the number of transmission and reception beam changes is based at least in part on one or more rules; and
communicate with the UE using a number of transmission and reception beams during the slot, the number of transmission and reception beams based at least in part on the number of transmission and reception beam changes that the UE has the capability to support during the slot.

43. The apparatus of claim 42, wherein:
two or more transmission and reception beams of the number of transmission and reception beams are each associated with a different instance of a reference signal transmission or reception, different orthogonal frequency division multiplexing (OFDM) symbols within the slot that have different quasi-co-location (QCL) assumptions, different spatial relations, different transmission directions, or any combinations thereof.

44. The apparatus of claim 42, wherein each transmission and reception beam of the number of transmission and reception beams is associated with a different spatial domain filter, and the one or more rules comprise:
- if the UE is configured with one or more synchronization signal blocks (SSBs) for reference signal measurements, the UE is assumed to apply a same spatial domain filter to receive all symbols carrying one SSB,
- if the UE is configured with a channel state information reference signal (CSI-RS) resource set with multiple repetitions, the UE is assumed to apply different spatial domain filters to receive different CSI-RS resources of different repetitions in the CSI-RS resource set,
- if the UE is configured with a CSI-RS resource that has no transmission configuration indication (TCI) state configured or a sounding reference signal (SRS) resource that has no spatial relation configured, the UE is assumed to change spatial domain filters to receive adjacent CSI-RS resources or transmit adjacent SRS resources,
- if two adjacent downlink symbols within the slot have different configured or activated quasi-co-location (QCL) assumptions, the UE is assumed to apply different spatial domain filters for the two adjacent downlink symbols,
- if two adjacent uplink symbols within the slot have different configured or activated spatial relations, the UE is assumed to apply different spatial domain filters for the two adjacent uplink symbols,
- if two adjacent symbols within the slot are uplink/downlink or downlink/uplink, the UE is assumed to apply different spatial domain filters for the two adjacent symbols,
- if two adjacent downlink symbols within the slot have a same configured or activated QCL assumption, the UE is assumed to apply the same spatial domain filter for the two adjacent downlink symbols,
- if two adjacent uplink symbols within the slot have a same configured or activated spatial relation, the UE is assumed to apply the same spatial domain filter for the two adjacent uplink symbols, or
- any combinations thereof.

45. An apparatus for wireless communication, comprising:
- a processor; and
- memory coupled to the processor, the processor and memory configured to:
  - establish, at a base station, a connection with a user equipment (UE) using a beamformed wireless communication;
  - receive, from the UE, a capability indication of the UE;
  - determine, based at least in part on the capability indication, of a number of transmission and reception antenna set changes that the UE has a capability to support during a slot, wherein each transmission and reception antenna set change of the number of transmission and reception beam changes is based at least in part on one or more rules; and
  - communicate with the UE using a number of transmission and reception antenna sets during the slot, the number of transmission and reception antenna sets based at least in part on the number of transmission and reception antenna set changes that the UE has the capability to support during the slot.

46. The apparatus of claim 45, wherein:
two or more transmission and reception antenna sets of the number of transmission and reception antenna sets are each associated with a different instance of a reference signal transmission or reception, different orthogonal frequency division multiplexing (OFDM) symbols within the slot that have different quasi-co-location (QCL) assumptions, different spatial relations, different transmission directions, or any combinations thereof.

47. The apparatus of claim 45, wherein each transmission and reception antenna set of the number of transmission and reception antenna sets is associated with a different spatial domain filter, the one or more rules comprise:
- if the UE is configured with one or more synchronization signal blocks (SSBs) for reference signal measurements, the UE is assumed to apply a same spatial domain filter to receive all symbols carrying one SSB,
- if the UE is configured with a channel state information reference signal (CSI-RS) resource set with multiple repetitions, the UE is assumed to apply different spatial domain filters to receive different CSI-RS resources of different repetitions in the CSI-RS resource set,
- if the UE is configured with a CSI-RS resource that has no transmission configuration indication (TCI) state configured or a sounding reference signal (SRS) resource that has no spatial relation configured, the UE is assumed to change spatial domain filters to receive adjacent CSI-RS resources or transmit adjacent SRS resources,
- if two adjacent downlink symbols within the slot have different configured or activated quasi-co-location (QCL) assumptions, the UE is assumed to apply different spatial domain filters for the two adjacent downlink symbols,
- if two adjacent uplink symbols within the slot have different configured or activated spatial relations, the UE is assumed to apply different spatial domain filters for the two adjacent uplink symbols,
- if two adjacent symbols within the slot are uplink/downlink or downlink/uplink, the UE is assumed to apply different spatial domain filters for the two adjacent symbols,
- if two adjacent downlink symbols within the slot have a same configured or activated QCL assumption, the UE is assumed to apply the same spatial domain filter for the two adjacent downlink symbols,
- if two adjacent uplink symbols within the slot have a same configured or activated spatial relation, the UE is assumed to apply the same spatial domain filter for the two adjacent uplink symbols, or
- any combinations thereof.

48. An apparatus for wireless communication, comprising:
- means for establishing, at a user equipment (UE), a connection with a base station using a beamformed wireless communication;
- means for determining a number of transmission and reception beam changes that the UE has a capability to support during a slot, wherein each transmission and reception beam change of the number of transmission and reception beam changes is associated with a changed spatial domain filter, and wherein each transmission and reception beam change is based at least in part on one or more rules, the one or more rules comprising:
  - if the UE is configured with one or more synchronization signal blocks (SSBs) for reference signal measurements, the UE is assumed to apply a same spatial domain filter to receive all symbols carrying one SSB, if the UE is configured with a channel state information reference signal (CSI-RS) resource set with multiple repetitions, the UE is assumed to apply different spatial domain filters to receive different CSI-RS resources of different repetitions in the CSI-RS resource set, if the UE is configured with a CSI-RS resource that has no transmission configuration indication (TCI) state configured or a sounding reference signal (SRS) resource that has no spatial relation configured, the UE is assumed to change spatial domain filters to receive adjacent CSI-RS resources or transmit adjacent SRS resources, if two adjacent downlink symbols within the slot have different configured or activated quasi-co-location (QCL) assumptions, the UE is assumed to apply different spatial domain filters for the two adjacent downlink symbols, if two adjacent uplink symbols within the slot have different configured or activated spatial relations, the UE is assumed to apply different spatial domain filters for the two adjacent uplink symbols, if two adjacent symbols within the slot are uplink/downlink or downlink/uplink, the UE is assumed to apply different spatial domain filters for the two adjacent symbols, if two adjacent downlink symbols within the slot have a same configured or activated QCL assumption, the UE is assumed to apply the same spatial domain filter for the two adjacent downlink symbols, if two adjacent uplink symbols within the slot have a same configured or activated spatial relation, the UE is assumed to apply the same spatial domain filter for the two adjacent uplink symbols, or any combinations thereof; and means for transmitting, to the base station, an indication of the number of transmission and reception beam changes that the UE has the capability to support during the slot.

49. A non-transitory computer-readable medium storing code for wireless communication, the code comprising instructions executable by a processor to:

establish, at a user equipment (UE), a connection with a base station using a beamformed wireless communication;

determine a number of transmission and reception beam changes that the UE has a capability to support during a slot, wherein each transmission and reception beam change of the number of transmission and reception beam changes is associated with a changed spatial domain filter, and wherein each transmission and reception beam change is based at least in part on one or more rules, the one or more rules comprising:

if the UE is configured with one or more synchronization signal blocks (SSBs) for reference signal measurements, the UE is assumed to apply a same spatial domain filter to receive all symbols carrying one SSB, if the UE is configured with a channel state information reference signal (CSI-RS) resource set with multiple repetitions, the UE is assumed to apply different spatial domain filters to receive different CSI-RS resources of different repetitions in the CSI-RS resource set, if the UE is configured with a CSI-RS resource that has no transmission configuration indication (TCI) state configured or a sounding reference signal (SRS) resource that has no spatial relation configured, the UE is assumed to change spatial domain filters to receive adjacent CSI-RS resources or transmit adjacent SRS resources, if two adjacent downlink symbols within the slot have different configured or activated quasi-co-location (QCL) assumptions, the UE is assumed to apply different spatial domain filters for the two adjacent downlink symbols, if two adjacent uplink symbols within the slot have different configured or activated spatial relations, the UE is assumed to apply different spatial domain filters for the two adjacent uplink symbols, if two adjacent symbols within the slot are uplink/downlink or downlink/uplink, the UE is assumed to apply different spatial domain filters for the two adjacent symbols, if two adjacent downlink symbols within the slot have a same configured or activated QCL assumption, the UE is assumed to apply the same spatial domain filter for the two adjacent downlink symbols, if two adjacent uplink symbols within the slot have a same configured or activated spatial relation, the UE is assumed to apply the same spatial domain filter for the two adjacent uplink symbols, or any combinations thereof; and transmit, to the base station, an indication of the number of transmission and reception beam changes that the UE has the capability to support during the slot.

* * * * *